United States Patent
Salkintzis et al.

(10) Patent No.: US 12,556,921 B2
(45) Date of Patent: Feb. 17, 2026

(54) GATEWAY FUNCTION REAUTHENTICATION

(71) Applicant: Lenovo (Singapore) Pte. Ltd., New Tech Park (SG)

(72) Inventors: Apostolis Salkintzis, Athens (GR); Sheeba Backia Mary Baskara, Friedrichsdorf (DE); Andreas Kunz, Ladenburg (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 174 days.

(21) Appl. No.: 17/923,903

(22) PCT Filed: May 6, 2020

(86) PCT No.: PCT/EP2020/062507
§ 371 (c)(1),
(2) Date: Nov. 7, 2022

(87) PCT Pub. No.: WO2021/223862
PCT Pub. Date: Nov. 11, 2021

(65) Prior Publication Data
US 2023/0188988 A1   Jun. 15, 2023

(51) Int. Cl.
*H04W 12/069*   (2021.01)
*G06F 15/16*   (2006.01)
(Continued)

(52) U.S. Cl.
CPC ......... *H04W 12/069* (2021.01); *H04W 12/08* (2013.01); *H04W 12/60* (2021.01); *H04W 88/16* (2013.01)

(58) Field of Classification Search
CPC ... H04W 12/069; H04W 12/08; H04W 12/60; H04W 88/16; H04W 84/12; H04W 88/06
(Continued)

(56) References Cited

U.S. PATENT DOCUMENTS

2008/0026724 A1* 1/2008 Zhang ................... H04W 12/06
                                                              455/411
2011/0047592 A1   2/2011 Feder et al.
(Continued)

FOREIGN PATENT DOCUMENTS

| WO | 2006005999 A1 | 1/2006 |
|---|---|---|
| WO | 2020034378 A1 | 2/2020 |
| WO | 2020064107 A1 | 4/2020 |

OTHER PUBLICATIONS

PCT/EP2020/062505, "Notification of Transmittal of the International Search Report and the Written Opinion of the International Searching Authority, or the Declaration", International Searching Authority, Jan. 11, 2021, pp. 1-14.
(Continued)

*Primary Examiner* — David R Lazaro
*Assistant Examiner* — Berhanu Shitayewoldetadik
(74) *Attorney, Agent, or Firm* — Kunzler Needham & Hilton

(57) ABSTRACT

Apparatuses, methods, and systems are disclosed for supporting TNGF reauthentication. One apparatus includes a network interface that communicates with a remote unit (i.e., UE) and with a mobile communication network. The apparatus includes a processor that receives a first EAP message containing a NAI from the UE. Here, the NAI indicates that the UE requests to reauthenticate with a source gateway function. The processor receives a UE context of the UE and derives a first EAP challenge packet using the UE context. Via the network interface, the processor sends the first EAP challenge packet to the UE. Here, the first EAP challenge packet is used to authenticate the target TNGF with the UE.

20 Claims, 23 Drawing Sheets

(51) Int. Cl.
  *H04L 15/16*    (2006.01)
  *H04M 1/66*    (2006.01)
  *H04M 1/68*    (2006.01)
  *H04W 12/08*    (2021.01)
  *H04W 12/60*    (2021.01)
  *H04W 76/02*    (2009.01)
  *H04W 88/10*    (2009.01)
  *H04W 88/16*    (2009.01)

(58) Field of Classification Search
  USPC .............................................................. 726/6
  See application file for complete search history.

(56) References Cited

U.S. PATENT DOCUMENTS

| | | | |
|---|---|---|---|
| 2011/0128945 A1 | 6/2011 | Lin et al. | |
| 2013/0208591 A1* | 8/2013 | Larsen | H04L 63/105 |
| | | | 370/230 |
| 2013/0343292 A1* | 12/2013 | Westerberg | H04W 76/16 |
| | | | 370/329 |
| 2015/0282226 A1* | 10/2015 | Fan | H04L 45/68 |
| | | | 370/329 |
| 2019/0259495 A1* | 8/2019 | Fridman | G16H 40/63 |
| 2020/0128403 A1* | 4/2020 | Wu | H04W 36/0033 |
| 2021/0185524 A1* | 6/2021 | Wu | H04W 12/043 |
| 2022/0150694 A1 | 5/2022 | Lehtovirta et al. | |
| 2022/0360634 A1* | 11/2022 | Rommer | H04L 63/0485 |

OTHER PUBLICATIONS

Cao et al., "EAP Extensions for the EAP Re-authentication Protocol (ERP)", IETF RFC 6696, Jul. 2012, pp. 1-47.
3GPP, "3rd Generation Partnership Project; Technical Specification Group Services and System Aspects; Study on the Wireless and Wireline Convergence for the 5G system architecture (Release 16)", 3GPP TR 23.716 V16.0.0, Dec. 2018, pp. 1-184.
3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.
3GPP, "3rd Generation Partnership Project; Technical Specification Group Core Network and Terminals; Access to the 3GPP 5G Core Network (5GCN) via Non-3GPP Access Networks (N3AN); Stage 3 (Release 16)", 3GPP TS 24.502 V16.3.0, Mar. 2020, pp. 1-84.
PCT/EP2020/062507, "Notification of Transmittal of the International Search Report and the Written Opinion of the International Searching Authority, or the Declaration", International Searching Authority, Mar. 1, 2021, pp. 1-22.
Motorola Mobility et al., "Conclusions about Trusted Non-3GPP Access", SA WG2 Meeting #129bis S2-1812598, Nov. 26-30, 2018, pp. 1-18.
3GPP, "3rd Generation Partnership Project; Technical Specification Group Services and System Aspects; 3GPP system to Wireless Local Area Network (WLAN) interworking; System description (Release 6)", 3GPP TS 23.234 V6.1.0, Jun. 2004, pp. 1-94.
3GPP, "3rd Generation Partnership Project; Technical Specification Group Service and System Aspects; 3G Security; Wireless Local Area Network (WLAN) interworking security (Release 6)", 3GPP TS 33.234 V6.1.0, Jun. 2004, pp. 1-67.
Pacyna et al., "Evaluation of EAP re-authentication protocol," 2016 17th International Telecommunications Network Strategy and Planning Symposium (Networks), XP033003496, 2016, pp. 1-5.
U.S. Appl. No. 17/923,820, "Office Action Summary", USPTO, Mar. 5, 2025, pp. 1-31.
Motorola Mobility et al., "Update of Solution #1: Support of Trusted Non-3GPP Access", SA WG2 Meeting #128 S2-187002, Jul. 2-6, 2018, pp. 1-18.

* cited by examiner

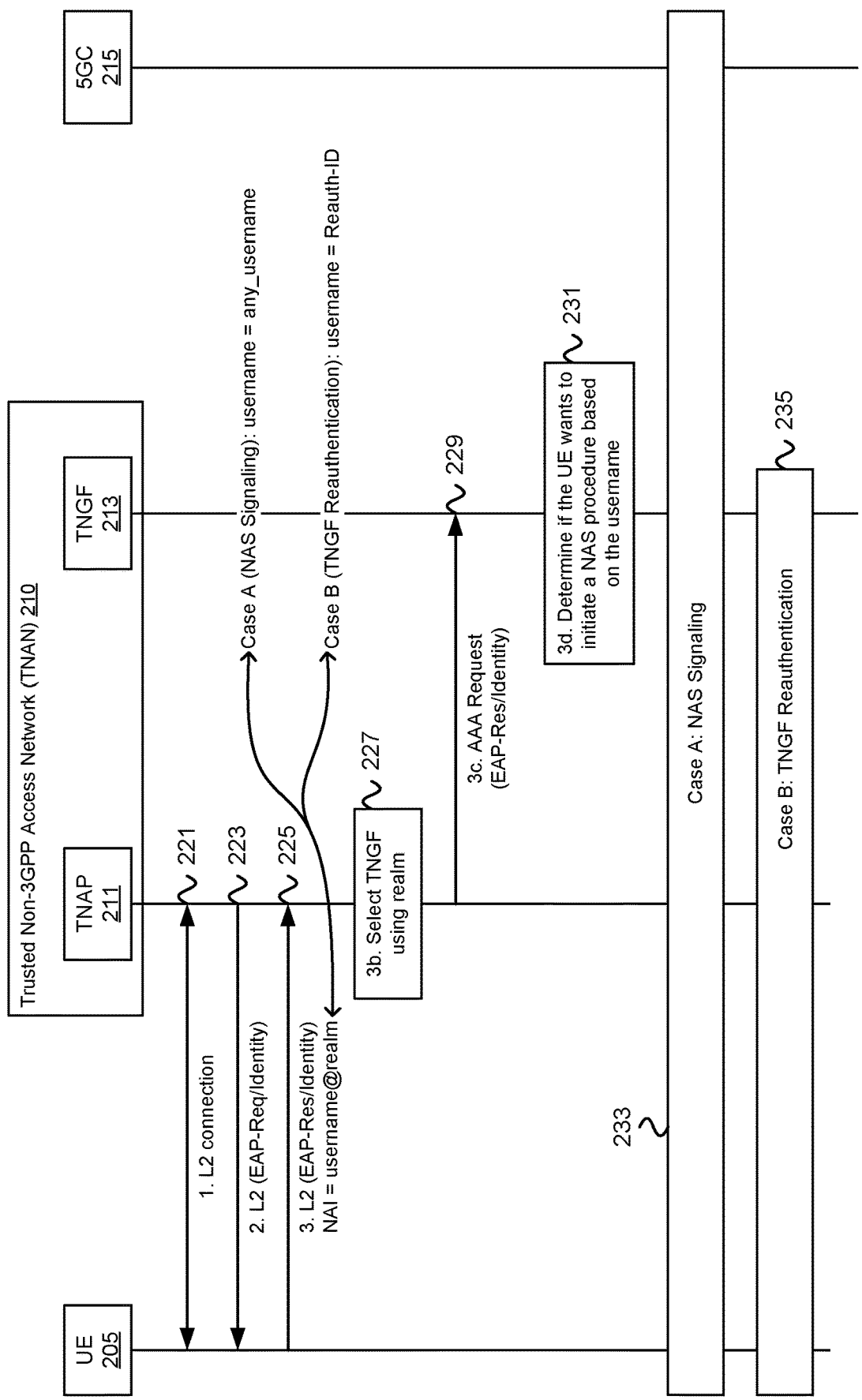

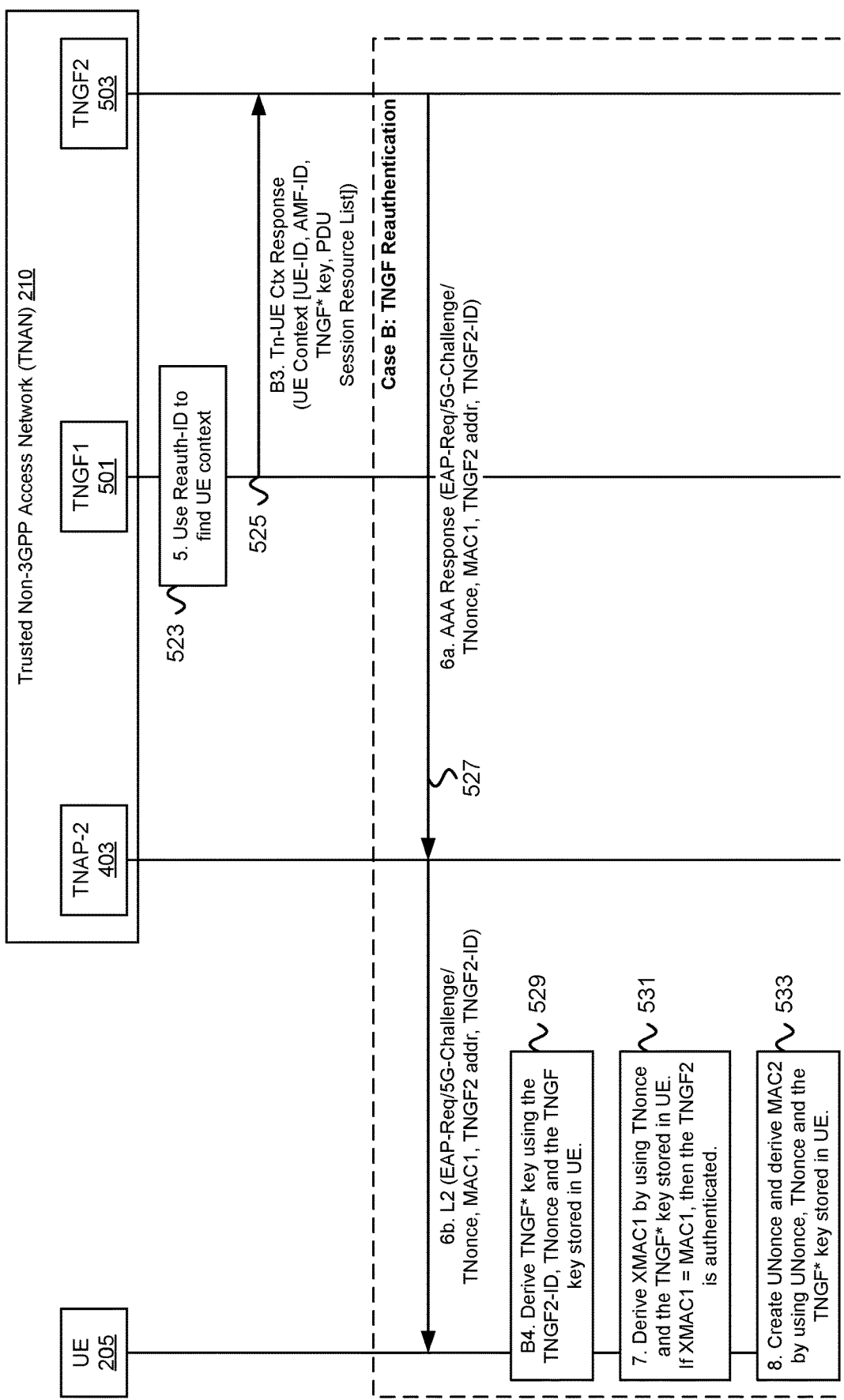

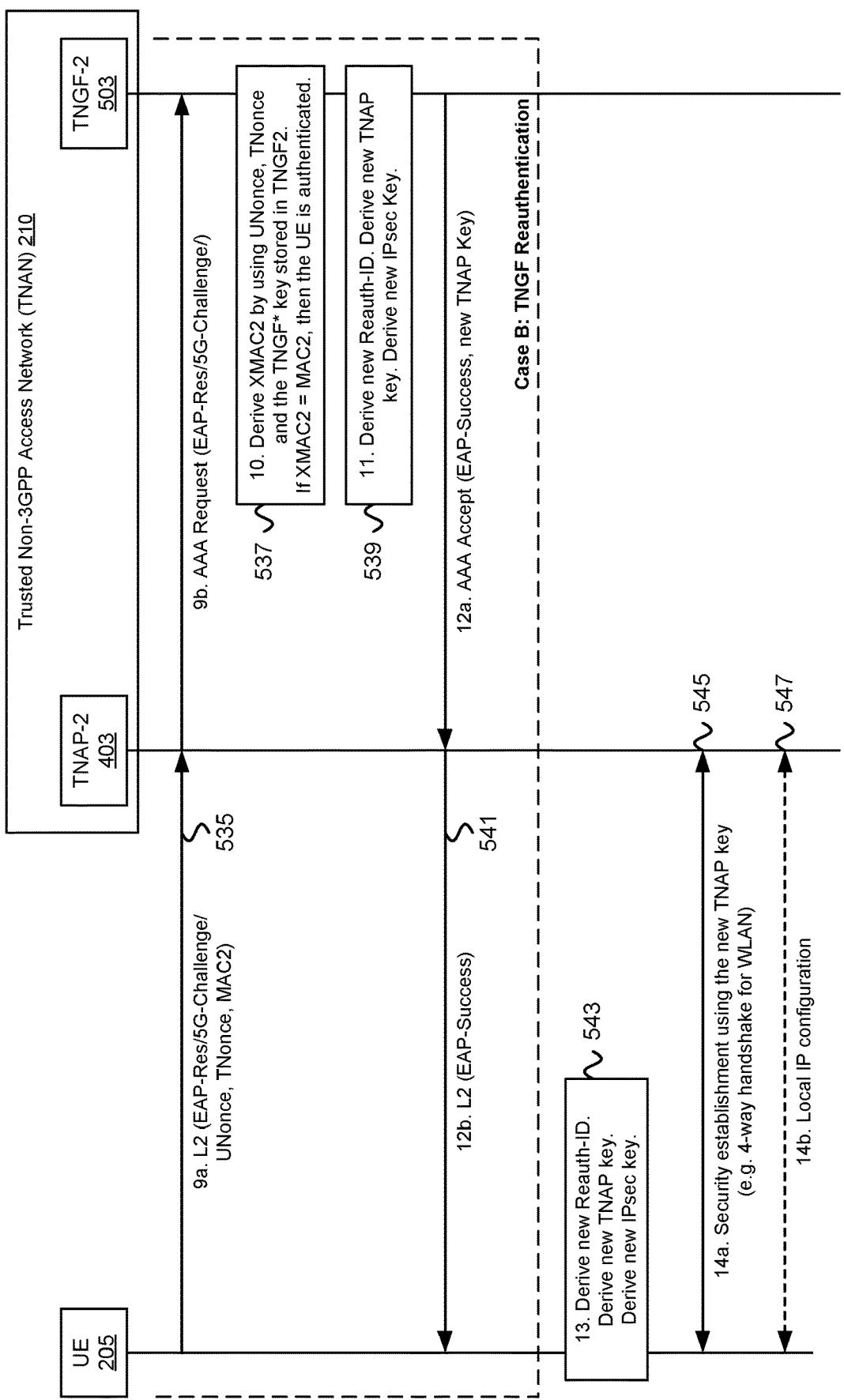

GATEWAY FUNCTION REAUTHENTICATION

The subject matter disclosed herein relates generally to supporting reauthentication with a Trusted Non-3GPP Gateway Function ("TNGF").

BACKGROUND

The following abbreviations and acronyms are herewith defined, at least some of which are referred to within the following description.

Third Generation Partnership Project ("3GPP"), Fifth-Generation Core network ("5GC"), Access and Mobility Management Function ("AMF"), Access Point Name ("APN"), Access Stratum ("AS"), Access Network Information ("ANI"), Application Programming Interface ("API"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Home Subscriber Server ("HSS"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Network Operator ("MNO"), Mobility Management Entity ("MME"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Security Mode Control ("SMC"), Single Network Slice Selection Assistance Information ("S-NSSAI"), Serving Gateway ("SGW"), Session Management Function ("SMF"), Transmission Control Protocol ("TCP"), Transmit ("Tx"), Trusted Non-3GPP Access Network ("TNAN"), Trusted Non-3GPP Access Point ("TNAP"), Trusted Non-3GPP Gateway Function ("TNGF"), Unified Data Management ("UDM"), User Entity/Equipment (Mobile Terminal) ("UE"), Uplink ("UL"), User Plane ("UP"), Universal Mobile Telecommunications System ("UMTS"), User Datagram Protocol ("UDP"), User Location Information ("ULI"), Wireless Local Area Network ("WLAN"), and Worldwide Interoperability for Microwave Access ("WiMAX").

In certain embodiments, a UE may access a 5G core ("5GC") network via a gateway function in a trusted non-3GPP access network ("TNAN").

BRIEF SUMMARY

One method of a UE, e.g., for supporting TNGF reauthentication, includes establishing connectivity with a first access point in the non-3GPP access network. Here, the first access point initiates an EAP session to authenticate the UE. The method includes sending a first EAP message containing a NAI. If the NAI indicates that the UE requests to reauthenticate with a gateway function in the non-3GPP access network, then the method includes receiving a first EAP challenge packet used to authenticate the gateway function. If the NAI indicates that the UE requests to initiate a NAS signaling procedure with a mobile communication network, then the method includes receiving an EAP start packet. Here, the EAP start packet triggers the UE to send a first NAS message to the mobile communication network. The method includes completing an EAP session using a first EAP authentication method with the gateway function. Here, the first EAP authentication method is initiated by one of the first EAP challenge packet and the EAP start packet.

One method of a TNGF, e.g., for supporting TNGF reauthentication, includes receiving a first EAP message from a remote unit (i.e., UE) containing a NAI and sending a first EAP challenge packet in response to the NAI indicating that the UE requests to reauthenticate with the TNGF. Here, the first EAP challenge packet is used to authenticate the TNGF with the UE. The method includes sending an EAP start packet to the UE in response to the NAI indicating that the UE requests to initiate a NAS signaling procedure with a mobile communication network. Here, the EAP start packet triggers the UE to send a first NAS message to the mobile communication network. The method includes completing an EAP session with the UE using a first EAP authentication method. Here, the first EAP authentication method is initiated by one of the first EAP challenge packet and the EAP start packet.

One method of a target TNGF, e.g., for supporting TNGF reauthentication, includes receiving a first EAP message containing a NAI from a remote unit (i.e., UE). Here, the NAI indicates that the UE requests to reauthenticate with a source gateway function. The method includes receiving a UE context of the UE and derives a first EAP challenge packet using the UE context. The method includes sending the first EAP challenge packet to the UE. Here, the first EAP challenge packet is used to authenticate the target TNGF with the UE.

One method of a source TNGF, e.g., for supporting TNGF reauthentication, includes generating a UE context for a remote unit (i.e., UE) in response to successful authentication of a remote unit with the mobile communication network and receives a first request for the UE context from a first network function. Here, the first request indicating that a target gateway function is to serve the UE, wherein the first request includes a first set of parameters. The method includes deriving a first security key using at least one of the first set of parameters and a second security key stored in the UE context. The method includes sending a modified UE context to the first network function, the modified UE context including the first security key.

One method of an AMF, e.g., for supporting TNGF reauthentication, includes receiving a first request for the UE context of a remote unit (i.e., UE) from a target gateway function, the first request identifying a source gateway function. Here, the first request includes a first set of parameters. The method includes sending a second request to the source gateway function, the second request indicating that the target gateway function is to serve the UE. Here, the second request also includes the first set of parameters. The method includes receiving the UE context from the source gateway function and relaying the UE context to the target gateway function.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2A is a signal flow diagram illustrating one embodiment of an EAP-5G procedure over a trusted non-3GPP access network;

FIG. 5B is a continuation of the procedure depicted in FIG. 5A;

FIG. 5C is a continuation of the procedure depicted in FIG. 5B;

DETAILED DESCRIPTION

Figure 1:
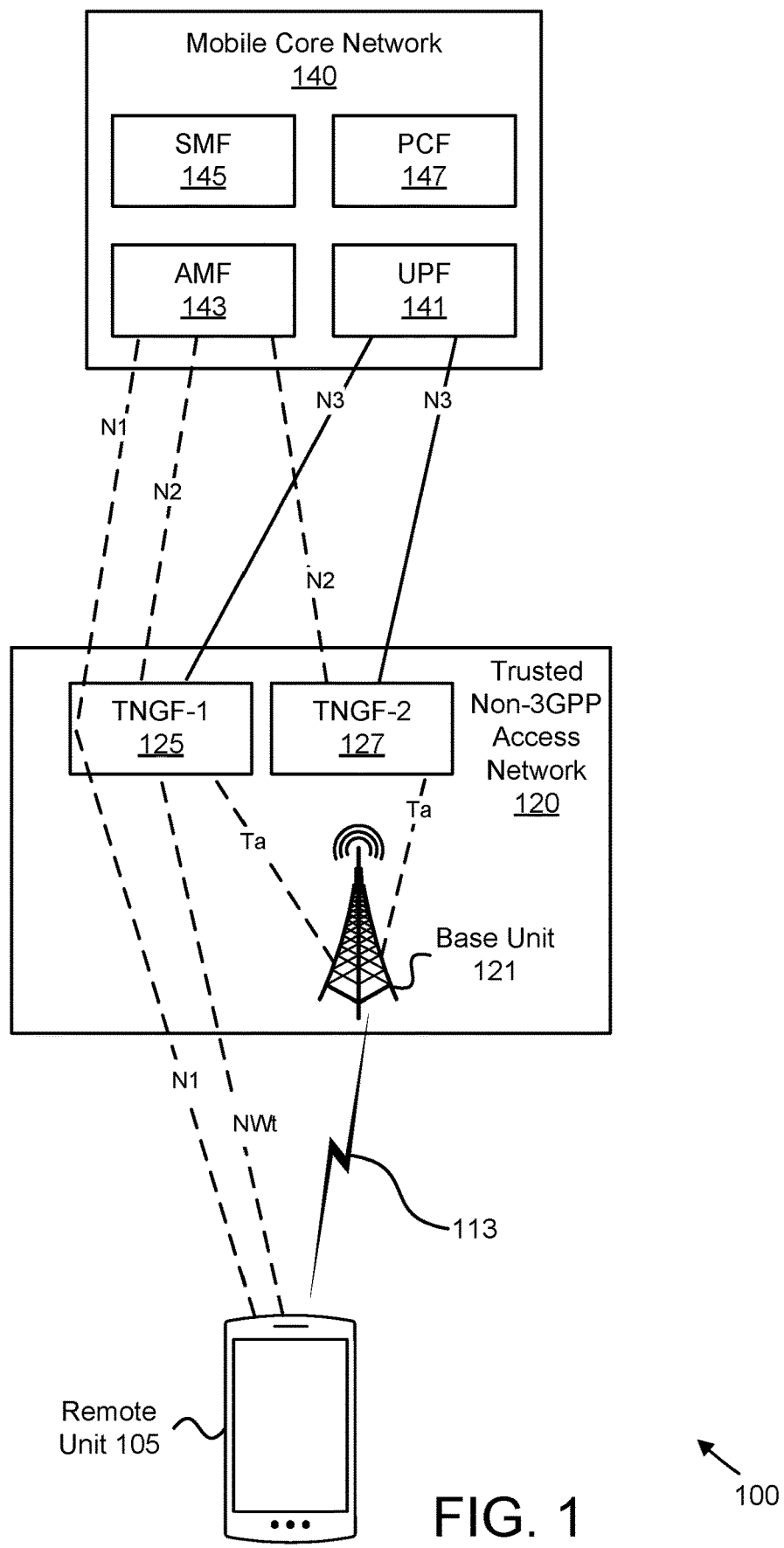
FIG. 1 is a diagram illustrating one embodiment of a wireless communication system for supporting TNGF reauthentication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for supporting TNGF reauthentication. A UE may access a 5G core ("5GC") network via a Trusted Non-3GPP Gateway Function ("TNGF") in a trusted non-3GPP access network ("TNAN"). When the UE wants to exchange NAS messages with 5GC via a TNAN, an EAP-5G session is initiated between the UE and a TNGF, and NAS messages are transferred over the EAP-5G session. This enables the UE to perform various 5G NAS procedures via trusted non-3GPP access, such as a registration procedure and a service request procedure. According to current 3GPP standards, when the TNGF receives an AAA request message from the UE (prerequisite to initiating the EAP-5G session), the TNGF implicitly assumes that the UE wants to initiate a NAS procedure and responds with a 5G-Start packet to trigger the NAS layer in the UE to send the first NAS message (e.g., a Registration Request).

However, there are many scenarios when an EAP-5G session is initiated not because the UE wants to perform NAS signaling with the 5GC, but because it wants to reconnect with a TNGF. Consider, for example, a mobility scenario where the UE is initially connected to the TNGF via a first TNAP and then decides to transition to a second TNAP. In this scenario, the second TNAP initiates an EAP session to authenticate the UE. However, in this case, the TNGF should not send an 5G-Start packet to UE because this will trigger the NAS layer in the UE to send a NAS message, but the NAS layer does not need to send any NAS message.

Even if the UE responds to the 5G-Start packet with a NAS mobility message (e.g., with a Registration Request with Type=mobility), this NAS message will have to be relayed to 5GC, which will create unnecessary signaling on the N2 interface and unnecessary processing load in 5GC.

Disclosed herein are procedures that enable the TNGF to know whether the EAP-5G session is initiated because the UE wants to begin a NAS procedure with 5GC, or because the UE wants to simply reconnect with the TNGF and does not want to begin a NAS procedure with 5GC. The present disclosure defines such an approach, i.e., to enable the UE to reconnect with the TNGF without sending any NAS messages and without impacting the 5GC. During this reconnection, a mutual reauthentication must take place between the UE and the TNGF, thus, the method is referred to as "TNGF reauthentication."

As described in greater detail below, the UE uses the NAI username to signal whether it wants to begin a NAS procedure or to reconnect with the TNGF outside a NAS procedure. The UE sets the username to certain values (e.g., username="any_username") when the UE wants to exchange NAS signaling with 5GC and, thus, a full EAP-5G procedure should be triggered. This may occur when the UE attempts registration to 5GC, e.g., initial registration, periodic registration, or mobility registration. In this case, the NAS layer in the UE needs to send a Registration Request message. Alternatively, the UE may want to begin a NAS procedure when attempting to transit to CM-CONNECTED state from the CM-IDLE state. In this case, the NAS layer in the UE needs to send a NAS Service Request message.

In contrast, the UE sets username to a reauthentication identifier ("Reauth-ID") when the UE wants to reauthenticate and reconnect with a TNGF. This may occur when the UE moves from a first TNAP to a second TNAP and the UE attempts reconnection to TNGF via the second TNAP. Note that when the UE provides username="any_username," the UE is authenticated by the 5GC using explicit or implicit NAS authentication (as currently specified in 3GPP specs). In contrast, when the UE provides username=Reauth-ID, the UE is authenticated by the TNGF without involvement of 5GC.

An EAP session carries an inner EAP authentication method. So, there may be an EAP session with EAP-AKA authentication method, or an EAP session with EAP-TLS authentication method, or an EAP session with EAP-5G authentication method, etc.

In the disclosed solutions, the EAP session is initiated by the Access Point and carries an EAP authentication method (i.e., vendor-defined 'EAP-5G' method) initiated by the TNGF with either a 5G-Start or 5G-Challenge. The EAP session and the inner EAP authentication method are both completed with an EAP-Success (or EAP-Failure) packet.

FIG. 1 depicts a wireless communication system 100 for supporting TNGF reauthentication, according to embodiments of the disclosure. In one embodiment, the wireless communication system 100 includes at least one remote unit 105, at least one trusted non-3GPP access network ("TNAN") 120, and a mobile core network 140 in a PLMN. The TNAN 120 may be composed of at least one base unit 121. The remote unit 105 may communicate with the TNAN 120 using non-3GPP communication links 113, according to a radio access technology deployed by TNAN 120. Even though a specific number of remote units 105, base units 121, TNANs 120, and mobile core networks 140 are depicted in FIG. 1, one of skill in the art will recognize that any number of remote units 105, base units 121, TNANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as '4G') or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the TNAN 120 via uplink ("UL") and downlink ("DL") communication signals. Furthermore, the UL and DL communication signals may be carried over the communication links 113. Note, that the TNAN 120 is an intermediate network that provide the remote units 105 with access to the mobile core network 140.

The base units 121 may serve a number of remote units 105 within a serving area, for example, a cell or a cell sector, via a communication link 113. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the communication links 113. The communication links 113 may be any suitable carrier in licensed or unlicensed radio spectrum. The communication links 113 facilitate communication between one or more of the remote units 105 and/or one or more of the base units 121.

As noted above, the TNAN 120 supports secure signaling interfaces and interworking with the 5G core network. The TNAN includes at least one TNGF; in the depicted embodiment the TNAN 120 includes a first TNGF ("TNGF-1") 125 and a second TNGF ("TNGF-2") 127. In certain embodiments, the TNAN 120 supports a Tn interface between the TGNF in the TNAN 120.

The base units 121 may be distributed over a geographic region. In certain embodiments, a base unit 121 may also be referred to as a Trusted Non-3GPP Access Point ("TNAP"), an access terminal, an access point, a base, a base station, a relay node, a device, or by any other terminology used in the art. The base units 121 are generally part of a radio access network ("RAN"), such as the TNAN 120, that may include one or more controllers communicably coupled to one or more corresponding base units 121. These and other elements of radio access network are not illustrated but are well known generally by those having ordinary skill in the art. The base units 121 connect to the mobile core network 140 via the TNAN 120.

In some embodiments, the remote units 105 communicate with an application server (or other communication peer) via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the TNAN 120. In order to establish the PDU session, the remote unit 105 must be registered with the mobile core network.

In one embodiment, the mobile core network 140 is a 5G core ("5GC") or the evolved packet core ("EPC"), which may be coupled to a data network (such as the Internet and private data networks, among other data networks). A remote unit 105 may have a subscription or other account with the mobile core network 140. The present disclosure is not intended to be limited to the implementation of any particular wireless communication system architecture or protocol.

The mobile core network 140 includes several network functions ("NFs"). As depicted, the mobile core network 140 includes at least one user plane function ("UPF") 141. The mobile core network 140 also includes multiple control plane functions including, but not limited to, an Access and Mobility Management Function ("AMF") 143, a Session Management Function ("SMF") 145, and a Policy Control Function ("PCF") 147. In certain embodiments, the mobile core network 140 may also include a Unified Data Management function ("UDM") 149, an Authentication Server Function ("AUSF"), a Network Repository Function ("NRF") (used by the various NFs to discover and communicate with each other over APIs), or other NFs defined for the 5G Core.

In various embodiments, the mobile core network 140 supports different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF and a UPF, but the various network slices share the AMF 143, the PCF 147, and the UDM. In another example, each network slice includes an AMF, an SMF and a UPF. Although specific numbers and types of network functions are depicted in FIG. 1, one of skill in the art will recognize that any number and type of network functions may be included in the mobile core network 140.

In various embodiments, the remote unit 105 sends a first EAP message to the TNAN 120 containing a network access identifier ("NAI") which signals whether the remote unit 105 wants to begin a NAS procedure or to reconnect with the TNGF outside a NAS procedure.

Figure 2B:
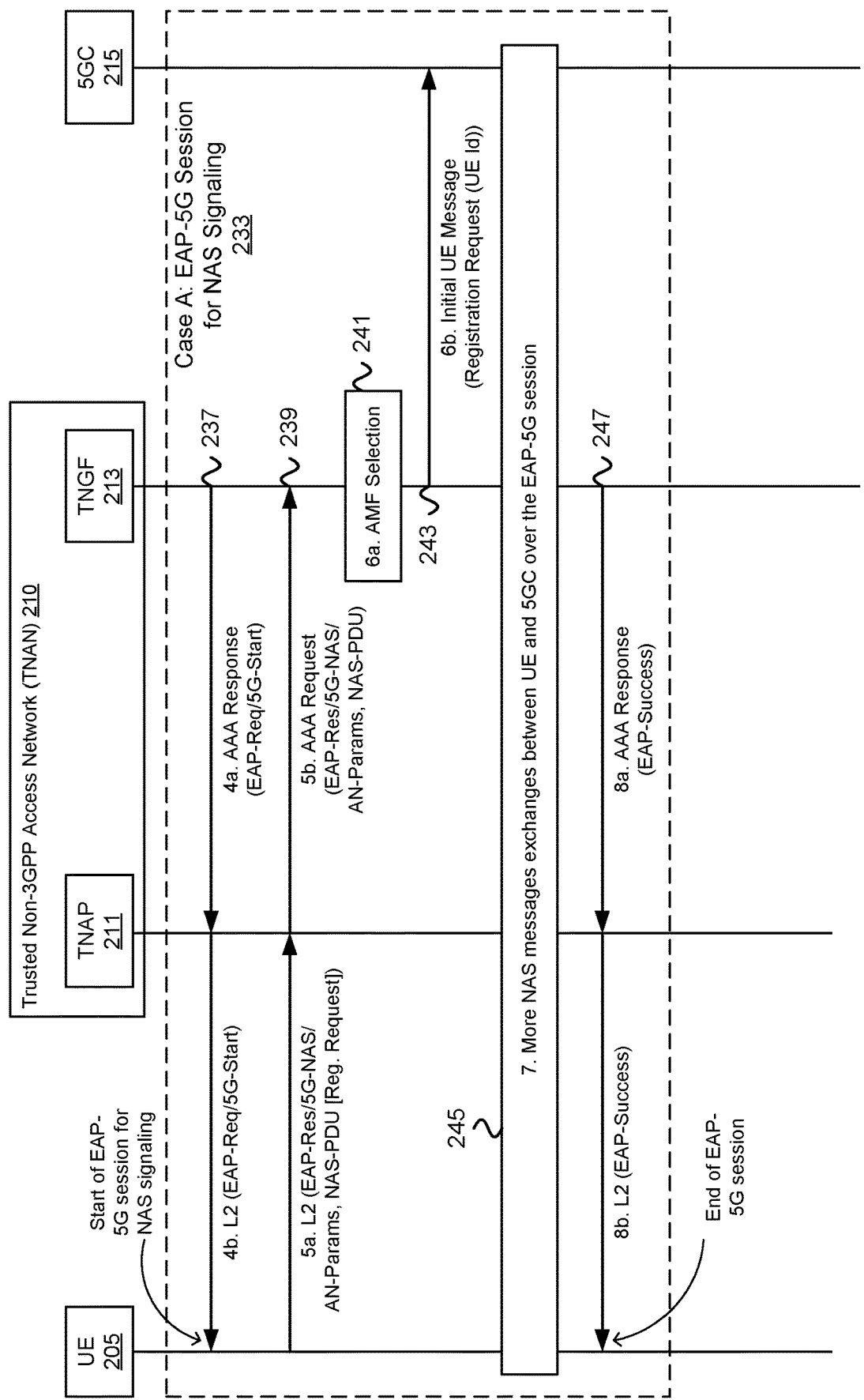
FIG. 2B is a signal flow diagram illustrating one embodiment of the NAS signaling procedure depicted in FIG. 2A.
Figure 2C:
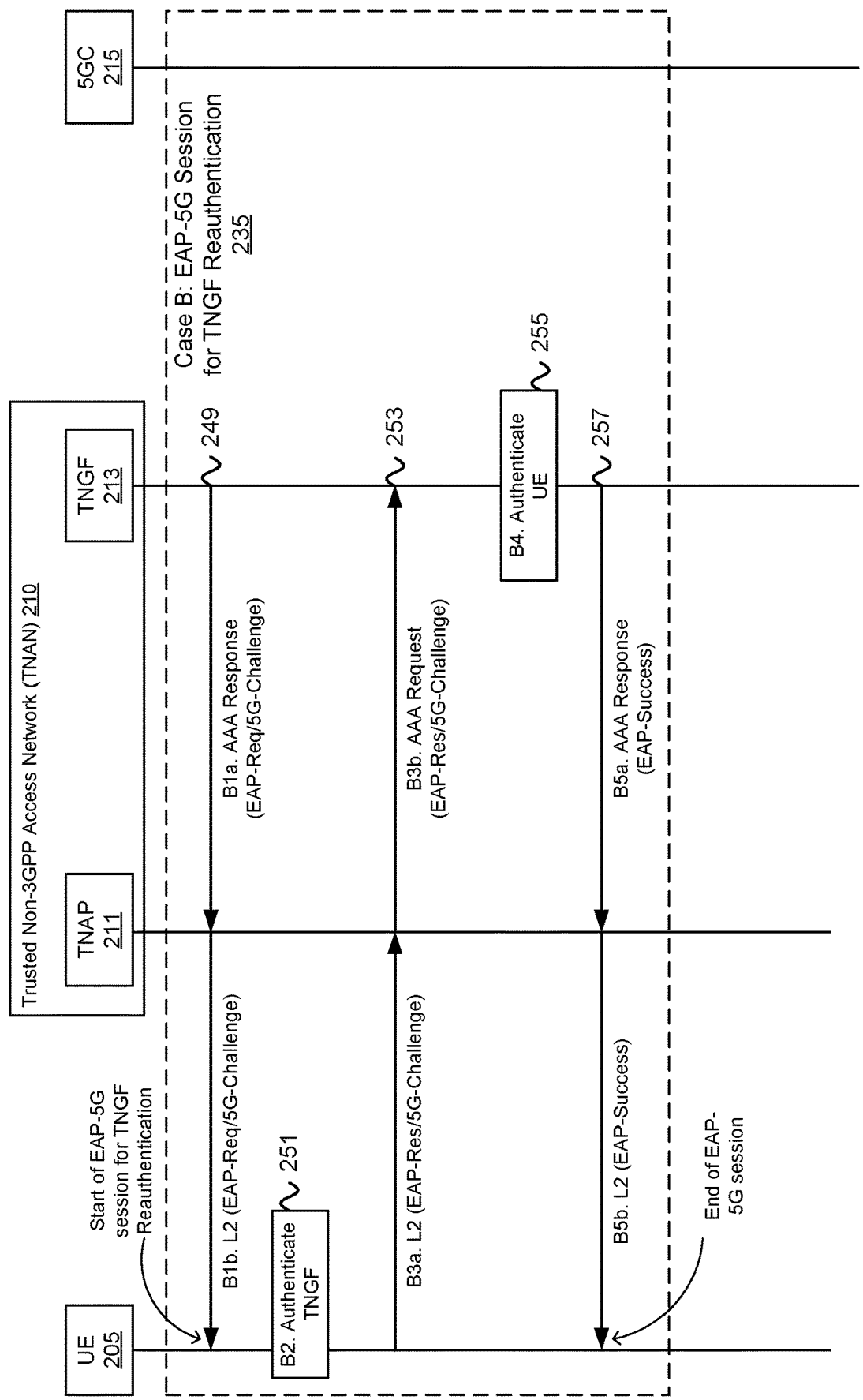
FIG. 2C is a signal flow diagram illustrating one embodiment of the TNGF reauthentication procedure depicted in FIG. 2A.

FIGS. 2A-2C depict a procedure 200 for an EAP-5G session over a trusted non-3GPP access network, according to embodiments of the disclosure. The procedure 200 involves the UE 205 (e.g., one embodiment of the remote unit 105), a TNAN 210 (e.g., one embodiment of the TNAN 120) comprising a TNAP 211 and a TNGF 213 (e.g., one embodiment of the TNGF 123), and a 5G core network 215 (e.g., one embodiment of the mobile core network 140). In the most typical case, the trusted non-3GPP access network 210 is a WLAN access network complying with the IEEE 802.11 specification.

The procedure 200 begins at FIG. 2A, in Step 1 the UE 205 decides to initiate an EAP session with a "trusted" non-3GPP access network (here, TNAN 210). In some embodiments, the UE 205 initiates the EAP session in order to exchange NAS messaging with the 5GC 215, e.g., to perform a NAS registration procedure. In other embodiments, the UE 205 initiates the EAP session in order to communicate with the TNAN without exchanging NAS messaging with the 5GC 215, e.g., in order to reconnect/reauthenticate with the TNGF 213.

To establish an EAP-5G session, the UE 205 first establishes a Layer-2 (L2) connection with a Trusted Non-3GPP Access Point (TNAP) 211 in the TNAN 210 (see messaging 221). In the case of an IEEE 802.11 WLAN, this L2 connection corresponds to an 802.11 Association.

At Steps 2-3, an EAP procedure is initiated by the TNAP 211. EAP messages are encapsulated into Layer-2 packets, e.g., into IEEE 802.11/802.1x packets. The TNAP 211 requests the UE Identity and the UE 205 sends a Network Access Identifier ("NAI") as a response (see messaging 223, 225).

As described herein, the UE 205 uses the NM to implicitly indicate to the TNAN 210 the purpose of the EAP session. In some embodiments, the UE 205 includes a username that indicates whether the UE 205 wants to initiate a NAS procedure with 5GC 215 or a reauthentication procedure with the TNAN 210 (e.g., with the TNGF 213). The present disclosure considers two cases: in Case A the UE 205 triggers the EAP session to exchange NAS messaging with the 5GC; in Case B the UE 205 triggers the EAP session to reauthenticate with the TNGF 213. Note that the UE 205 may trigger the EAP session for other non-NAS messaging procedures.

In Case A, the NAI provided by the UE 205 indicates that the UE 205 Requests "5G connectivity" to a specific PLMN, e.g., NM="<any_username>@nai.5gc.mnc<MNC>.mcc <MCC>.3gppnetwork.org." The UE 205 sets the username to "any_username" (i.e., to any non-null string), as currently specified in TS 23.502. In this case, a full EAP-5G procedure is initiated and enables the exchange of NAS messages between the UE and the 5GC.

However, in Case B, the NAI provided by the UE 205 indicates that the UE 205 Requests "TNGF Reauthentication" with the TNGF 213, e.g., NAI="<Reauth_ID>@nai.5gc.tngf<TNGF-ID>.mnc<MNC>.mcc<MCC>.3gppnetwork.org." The UE 205 sets the username to a reauthentication identity (Reauth-ID) that is defined below. In this case, an EAP-5G reauthentication procedure is initiated between the UE and the TNGF, also called TNGF reauthentication.

The NAI triggers the TNAP 211 to select a TNGF (i.e., TNGF 213, see block 227) and send an AAA Request to the selected TNGF 213 (see messaging 229). Between the TNAP 211 and the TNGF 213, each EAP packet is encapsulated into an AAA message. For Case B, if the UE is already connected with a TNGF (i.e., the UE already has a NWt connection), the UE includes the identity of this TNGF (TNGF-ID). The TNAP 211 in step 3*b* selects a TNGF by using the received TNGF-ID, so it selects the TNGF that is already connected with the UE 205, if possible.

The TNGF 213 examines the NAI to determine whether the UE is trying to initiate a NAS procedure or a TNGF Reauthentication procedure (see block 231). If the NAI indicates to that the UE 205 wants to exchange NAS signaling (Case A, see block 233), then the TNGF 213 initiates an EAP-5G session to enable the UE 205 to exchange NAS signaling with the 5GC 215, as described in further detail below. Otherwise, if the NAI indicates that the UE 205 wants to reauthenticate with the TNGF 213 (Case B, see block 235), then the TNGF 213 initiates an EAP-5G session for TNGF Reauthentication, as described in further detail below.

FIG. 2B depicts an overview of an EAP-5G session 233 for NAS signaling according to Case A. If the TNGF determines that the UE wants to initiate a NAS procedure, then it responds with an 5G-Start packet and a full EAP-5G procedure initiates. At Step 4, after receiving the AAA request the TNGF 213 responds with an AAA response message, which includes an EAP-Request/5G-Start packet indicating to the UE 205 that an EAP-5G session starts and the UE 205 can start sending NAS messages encapsulated within EAP-5G packets (see messaging 237).

At Step 5, the UE 205 sends an EAP-Response/5G-NAS packet that contains Access Network parameters (AN-Params) and a Registration Request message (or a Service Request message) (see messaging 239). The TNAP 211 forwards the EAP-Response/5G-NAS packet to the TNGF 213 within an AAA Request message.

At Step 6, the TNGF 213 selects an AMF in the 5G core network 215 and forwards the Registration Request (or the Service Request) received from the UE 205 to the selected AMF within an N2 Initial UE 205 Message (see messaging 243). At step 7, the UE 205 and AMF in the 5GC 215 exchange additional NAS messages over the EAP-5G session (see block 245). Examples of the additional NAS messages include, but are not limited to, those involved with NAS authentication.

At Step 8, the TNGF 213 determines that the EAP-5G session is to be completed successfully and sends an EAP-Success packet to UE 205 (see messaging 247). This packet may be sent after exchanging 5G-Notification packets, e.g., as specified in TS 23.502. The EAP-Success packet (or EAP-Failure packet) concludes the EAP-5G session.

FIG. 2C depicts an overview of an EAP-5G session 235 for TNGF reauthentication according to Case B. The TNGF reauthentication procedure (Case B) is used to perform a mutual reauthentication between the UE 205 and the TNGF 213 and can be executed only after a common TNGF key exists in the UE 205 and TNGF 213, created with a prior NAS signaling procedure. The TNGF key can be created only signaling according to Case A has been carried out.

At Step B1, after receiving the AAA request (see FIG. 2A, step 3) the TNGF 213 responds with an AAA response message, which includes a first 5G-Challenge packet (i.e., EAP-Request/5G-Challenge packet) indicating to the UE 205 that an EAP-5G session starts for the TNGF reauthentication procedure (see messaging 249).

At step B2, the UE 205 uses contents of the first 5G-Challenge packet to authenticate the TNGF 213 (see block 251). If successful, then at step B3 the UE 205 responds to the TNGF 213 by sending a second 5G-Challenge packet (i.e., EAP-Response/5G-Challenge packet, see messaging 253). At step B4, the TNGF 213 uses contents of the second 5G-Challenge packet to authenticate the UE 205 (see block 255). At step B5, the TNGF 213 completes the EAP-5G session by sending an EAP-Success packet to UE 205 (see messaging 257). Details of the 5G-Challenge packets and mutual authentication procedure are discussed in further detail below with reference to FIGS. 4-6.

Figure 3A:
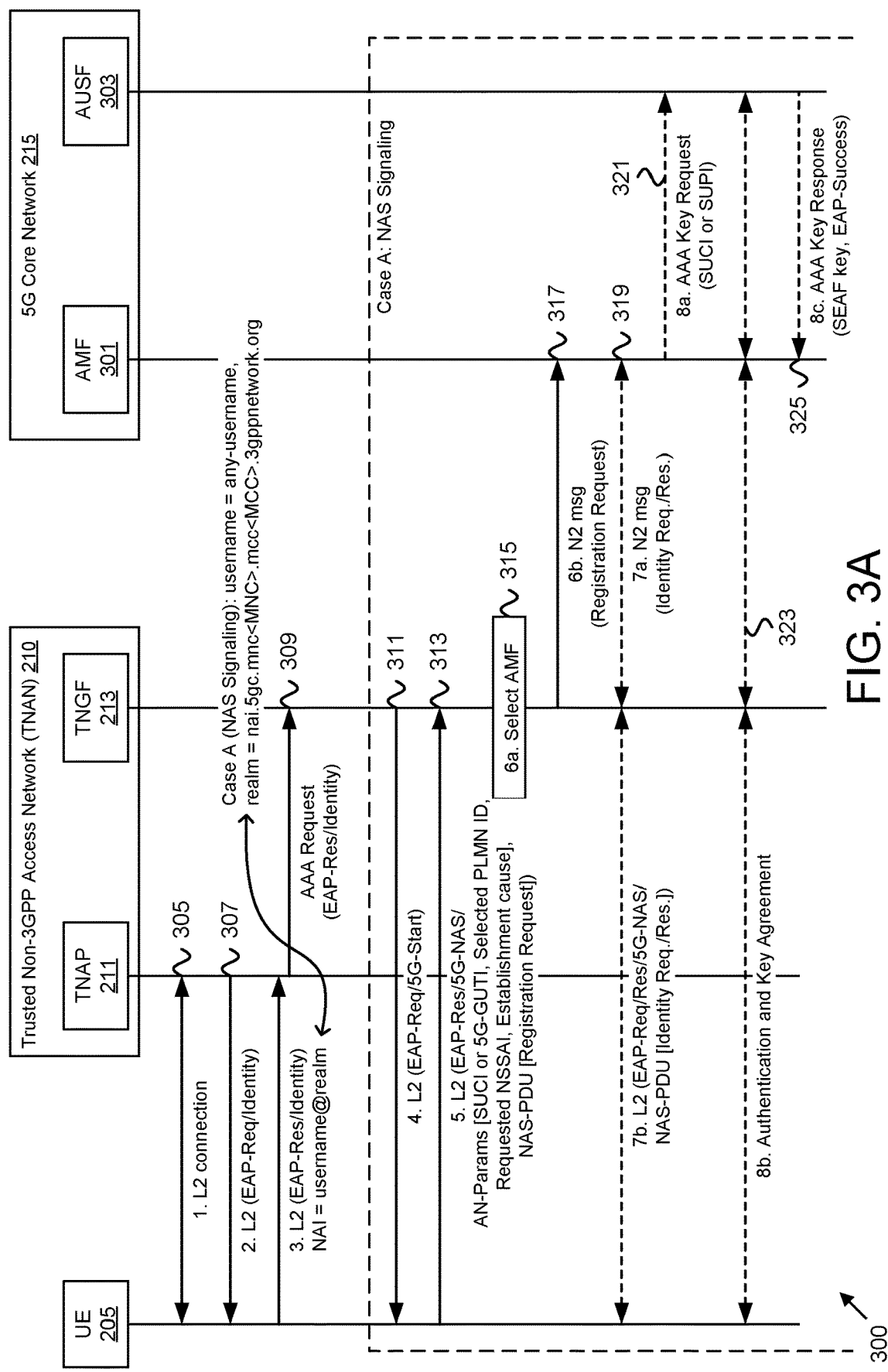
FIG. 3A is a signal flow diagram illustrating one embodiment of a 5G registration procedure over a trusted non-3GPP access network.
Figure 3B:
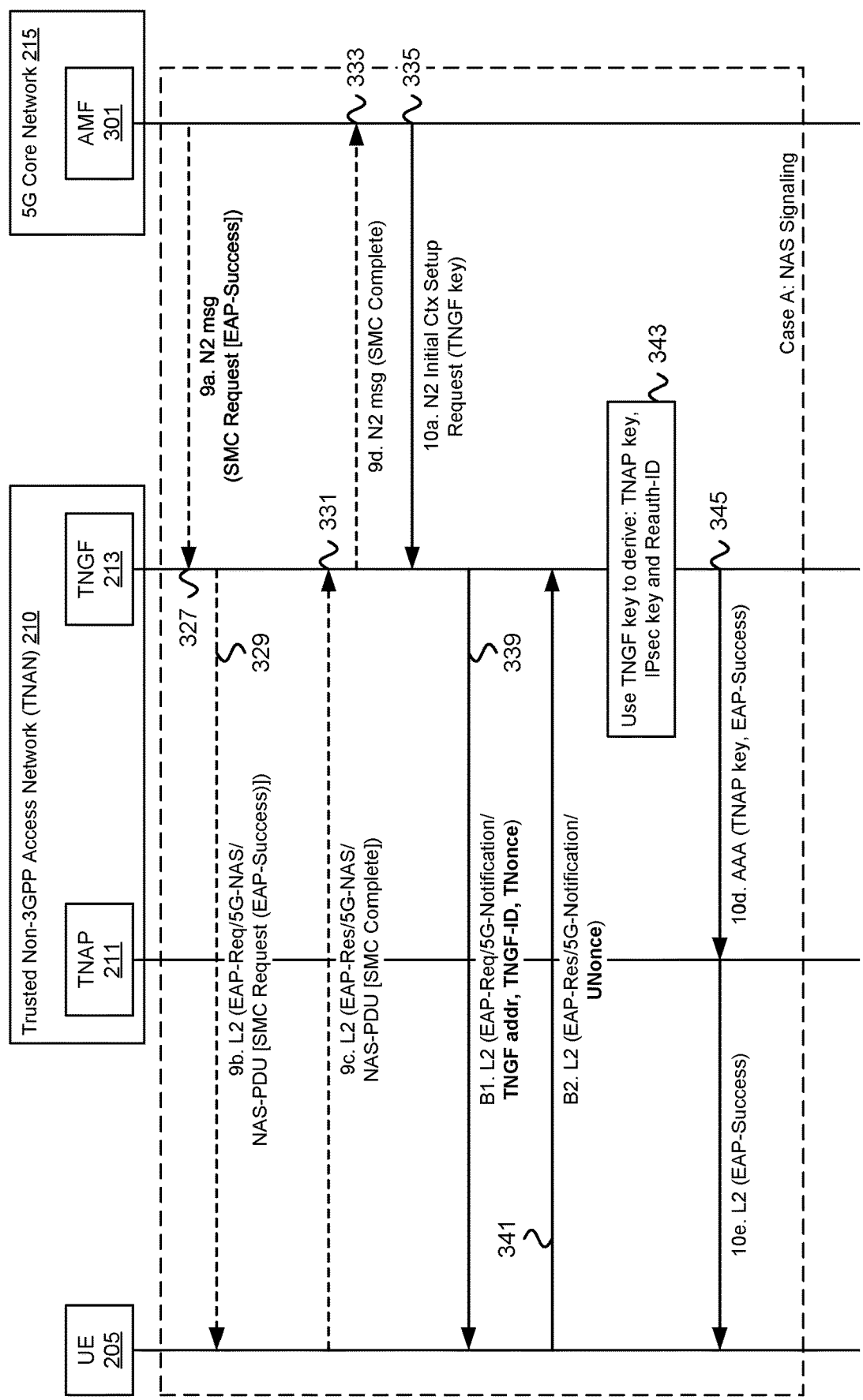
FIG. 3B is a continuation of the procedure depicted in FIG. 3A.
Figure 3C:
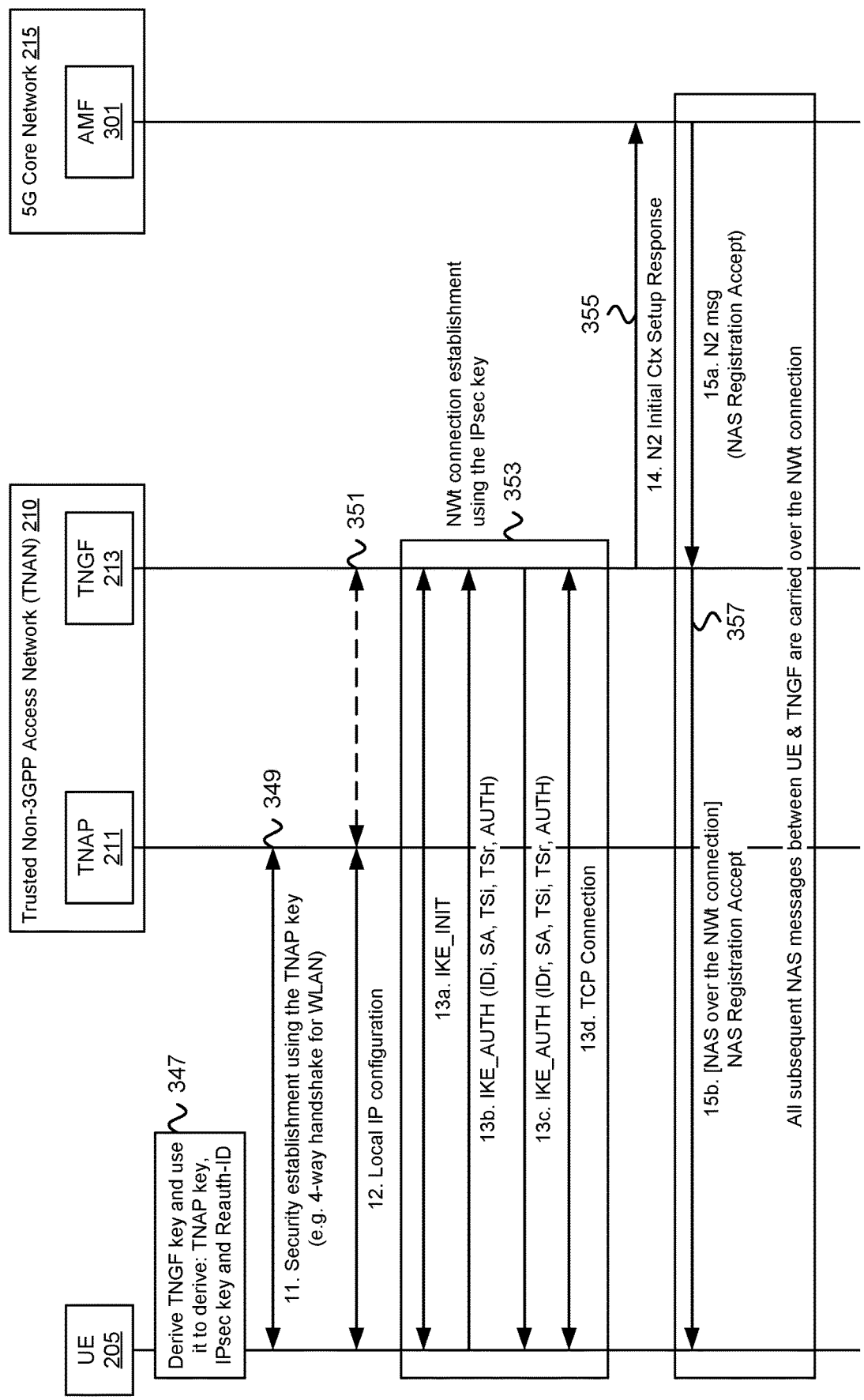
FIG. 3C is a continuation of the procedure depicted in FIG. 3B.

FIGS. 3A-3C depict a procedure 300 for a 5G registration over a trusted non-3GPP access network, according to embodiments of the disclosure. The procedure 300 involves the UE 205 (e.g., one embodiment of the remote unit 105), the TNAP 211 and TNGF 213 in the TNAN 210, and an AMF 301 (e.g., one embodiment of the AMF 143) and AUSF 303 in the 5G core network 215.

When the UE 205 wants to register to 5GC 215 via a TNAN 210 for the first time (called Initial Registration), the procedure illustrated in FIGS. 3A-3C is carried out. This procedure is modified a conventional registration procedure as shown and/or described below. These additions are required so that (a) a TNGF-ID is provided to UE and (b) a Reauth-ID is derived for the UE. The UE applies the TNGF-ID and the Reauth-ID during a TNGF reauthentication procedure as described below with reference to FIGS. 4A-4C, 5A-5D, and/or 6A-6B.

At FIG. 3A, the procedure 300 begins with Step 1 as the UE 205 first establishes a L2 connection with the TNAP 211 (see messaging 305). At Steps 2-3, an EAP procedure is initiated, the TNAP 211 requests the UE Identity and the UE 205 sends a Network Access Identifier ("NAI") as a response (see messaging 307-309).

Here, the NAI provided by the UE 205 indicates that the UE 205 Requests "5G connectivity" to a specific PLMN, e.g., NAI="<any_username>@nai.5gc.mnc<MNC>.mcc<MCC>.3gppnetwork.org." The UE 205 sets the username to "any_username" (i.e., to a non-null string), as currently specified in TS 23.502. This NAI triggers the TNAP to send an AAA request to a TNGF, which operates as an AAA proxy. Between the TNAP and TNGF the EAP packets are encapsulated into AAA messages. In this case, a full EAP-5G procedure is initiated and enables the exchange of NAS messages between the UE and the 5GC.

At Step 4, after receiving the AAA request the TNGF 213 responds with an AAA response message, which includes an EAP-Request/5G-Start packet indicating to the UE 205 that an EAP-5G session starts and the UE 205 can start sending NAS messages encapsulated within EAP-5G packets (see messaging 311).

Note that multiple TNGFs may be deployed in the TNAN 120, all of them providing access to the 5GC in the same PLMN. These TNGFs may support different Tracking Areas and network slices or may support the same Tracking Area and network slices. In the example embodiment shown in FIGS. 2A-2B, it is assumed that the selected TNGF 213 can support the network slices allowed by the 5G core network 215 for the UE 205, thus, there is no need to relocate this TNGF to another TNGF. However, in other embodiments, TNGF relocation may occur as part of the procedure 200.

At Step 5, the UE 205 sends an EAP-Response/5G-NAS packet that contains Access Network parameters (AN-Params) and a Registration Request message (or a Service Request message) (see messaging 313). Here, the AN-Params contain a UE identity (e.g., SUCI or 5G-GUTI), the Selected PLMN identity and an Establishment cause. Optionally, a Requested NSSAI may also be contained if the UE 205 does not operate in the default NSSAI Inclusion mode D (specified in 3GPP TS 23.502). The Establishment cause provides the reason for Requesting a signaling connection with the 5G core network 215 (i.e., initial registration). The TNAP 211 forwards the EAP-Response/5G-NAS packet to the TNGF 213 within an AAA Request message.

At Step 6a, the TNGF 213 selects an AMF in the 5G core network 215 of the selected PLMN based on the received AN-Params and local policy, e.g., as specified in 3GPP TS 23.501, clause 6.3.5 (see block 315). At Step 6b, the TNGF 213 forwards the Registration Request (or the Service Request) received from the UE 205 to the selected AMF within an N2 Initial UE 205 Message (see messaging 317). This message contains N2 parameters that include the Selected PLMN ID and the Establishment cause.

At conditional step 7, the AMF 301 may decide to request the SUCI by sending a NAS Identity Request message to the UE 205 (see messaging 319). This NAS message and all subsequent NAS messages are sent to the UE 205 encapsulated within EAP/5G-NAS packets.

At step 8, the AMF 301 may determine to authenticate the UE 205 by invoking an AUSF 303. In this case, the AMF 301 selects the AUSF 303 based on the SUPI or SUCI of the UE 205. At step 8a, the AMF 301 sends a Key request message to the AUSF 321. At step 8b, the UE 205 and AUSF 303 perform an authentication and key agreement procedure via TNGF 213 and AMF 301 (e.g., EAP-AKA' authentication or 5G-AKA authentication, see messaging 323). The authentication packets are encapsulated within NAS authentication messages and the NAS authentication messages are encapsulated within EAP/5G-NAS packets.

At step 8c, after the successful authentication, the AUSF 303 sends an anchor key (SEAF key) to the AMF 301 which is used by the AMF 301 to derive NAS security keys and a security key for the TNGF 213 (TNGF key). Note that the UE 205 also derives the anchor key (SEAF key) and from that key it derives the NAS security keys and the security key for the TNGF 213 (TNGF key). The TNGF key is used by the UE and N3IWF for establishing the IPsec Security Association in later steps.

Continuing on FIG. 3B at step 9a, the AMF 301 sends a NAS Security Mode Control ("SMC") Request towards the UE 205 in order to activate NAS security (see messaging 327). If authentication was successfully executed in step 8, the AMF 301 encapsulate an EAP-Success packet received from the AUSF 301 within the NAS SMC Request message.

At step 9b, the TNGF 213 forwards the NAS SMC Request message to the UE 205 within an EAP-Req/5G-NAS packet (see messaging 329).

At step 9c, the UE 205 completes the authentication procedure (if initiated in step 8), creates a NAS security context and the TNGF key and sends the NAS SMC Complete message (within an EAP-Res/5G-NAS packet) towards the AMF 301 (see messaging 331 and 333).

At step 10a, the AMF 301 sends an N2 Initial Context Setup Request message to the TNGF 213 that includes the TNGF key (see messaging 335). Note that the UE 205 independently derives the same TNGF key.

At step B1, after the TNGF 213 receives the TNGF key, the TNGF 213 sends a 5G-Notification packet to the UE 205 containing the TNGF Address and TNGF-ID of the TNGF 213, and the TNonce (see messaging 339). The TNGF Address is the IPv4/IPv6 address of the TNGF 213 and is used later by the UE to establish a NWt connection with the TNGF 213. The TNGF-ID is an identity of the TNGF 213 and the TNonce is a pseudo random value generated by TNGF 213 and is further discussed below. At step B2, the UE 205 sends a 5G-Notification packet to the TNGF 213 containing the UNonce (see messaging 341), which is a pseudo random value generated by the UE and is further discussed below.

The TNGF 213 uses the TNGF key to derive a TNAP key, an IPsec key, and a Reauthentication Identifier (Reauth-ID) for the UE 205 (see block 343). In various embodiments, the TNAP key and IPsec key are derived using conventional methods specified in 3GPP TS 33.501. Alternatively, the TNAP key and the IPsec key may be derived by using also the TNGF-ID, the TNonce and the UNonce values. In one example, the Reauth-ID may be derived by using a Key Derivation Function ("KDF," i.e., a cryptographic hash function) and the following formula:

$$\text{Reauth-ID} = \text{KDF (TNGF key, TNGF-ID} \| \text{TNonce-} \| \text{UNonce)}, \quad \text{Equation 1}$$

Note that the (TNGF key) and the (TNGF-ID||TNonce-||UNonce) are two inputs to the KDF, where the || symbol indicates concatenation. Note also that the Reauth-ID is independently derived in the UE 205 and in the TNGF 213 using the same KDF and the same equation.

At step 10d, the TNGF 213 sends the TNAP key and an EAP-Success packet to the TNAP 211, which forwards the EAP-Success packet to the UE 205 (see messaging 345). Delivery of the EAP-Success packet completes (i.e., ends) the EAP-5G session for NAS signaling (i.e., Case A). No further EAP-5G packets are exchanged.

Continuing on FIG. 3C, the UE 205 derives the TNGF key and uses the TNGF key to derive the TNAP key, the IPsec key, and the Reauth-ID (see block 347). In various embodiments, the Reauth-ID may be derived by using Equation 1. While depicted as occurring after the EAP-5G session terminates, in other embodiments the UE 205 may derive the TNGF key, TNAP key, IPsec key and/or Reauth-ID at another time after receiving the necessary inputs (e.g., after step B1).

At step 11, the TNAP key is used to establish layer-2 security (i.e., air-interface security) between the UE 205 and TNAP 211 (see messaging 349). In the case of IEEE 802.11, a 4-way handshake is executed, which establishes a security context between the WLAN AP (i.e., TNAP 211) and the UE 205 that is used to protect unicast and multicast traffic over the air. At step 12, the UE 205 receives an IP configuration from the TNAN 210, including an IP address (see messaging 351).

At steps 13, the UE 205 starts the establishment of an NWt connection 353 with the TNGF address received in Step B1 (i.e., as part of the TNGF-sent access parameters). At this point, the UE has successfully connected to the TNAN and has obtained IP configuration. First, at Step 13a, the UE 205 initiates an IKE procedure towards TNGF 213 by starting an IKE initial exchange, e.g., according to RFC 7296. In Steps 13b and 13c, IKE_AUTH Request/Response messages are exchanged using the AUTH payload, which is derived based on the common IPsec key created in the UE 205 and in the AMF 301. Note that the UE 205 identity (e.g., 5G-GUTI) received by TNGF 213 in step 13b (inside the IDi payload of the IKE signaling) indicates to the TNGF 213 which TNGF key should be used to authenticate the UE 205.

After the successful authentication in step 13c, a secure IPsec SA is created between the UE 205 and the TNGF 213. At Step 13d, the UE 205 establishes a TCP connection with TNGF 213 (as specified in TS 23.502), which completes the establishment of the NWt connection between the UE 205 and the TNGF 213.

At Step 14, after the NWt connection 353 between the UE 205 and the TNGF 213 is established, the TNGF 213 responds to the AMF 301 with an Initial Context Setup Response message, indicating that a secure connection with the UE 205 has be established (see messaging 355). At Steps 15, the AMF 301 sends a DL NAS Transport to the TNGF 213 containing a Registration Accept message for the UE 205. This message is forwarded to the UE 205 inside the established NWt connection (see messaging 357).

After the above signaling flow, the UE 205 registration to 5G core network 215 via trusted non-3GPP access is completed and the established NWt connection is used to transfer further NAS messages between the UE 205 and the TNGF 213.

Figure 4A:
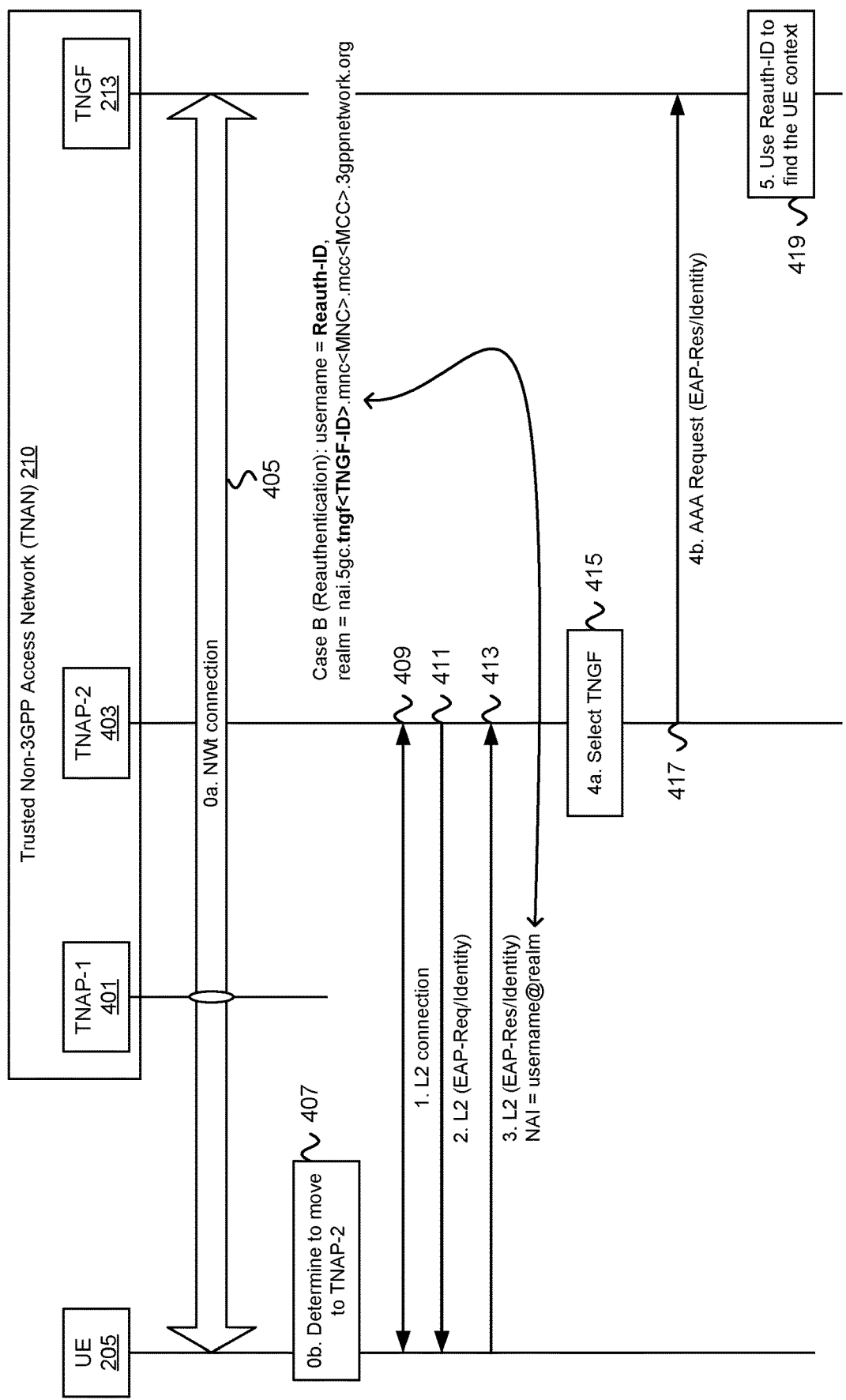
FIG. 4A is a signal flow diagram illustrating one embodiment of a first solution for TNGF reauthentication.
Figure 4B:
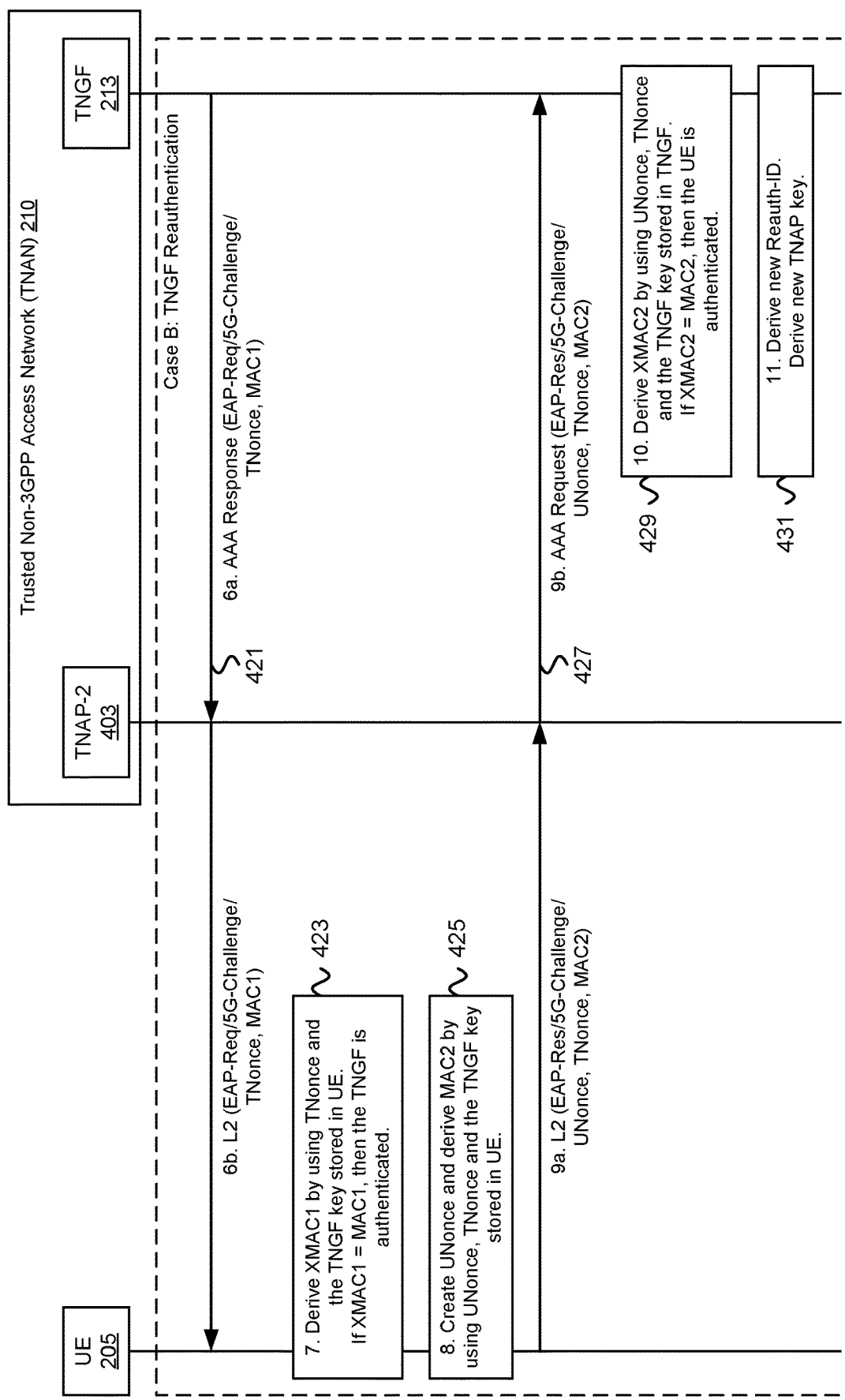
FIG. 4B is a continuation of the procedure depicted in FIG. 4A.
Figure 4C:
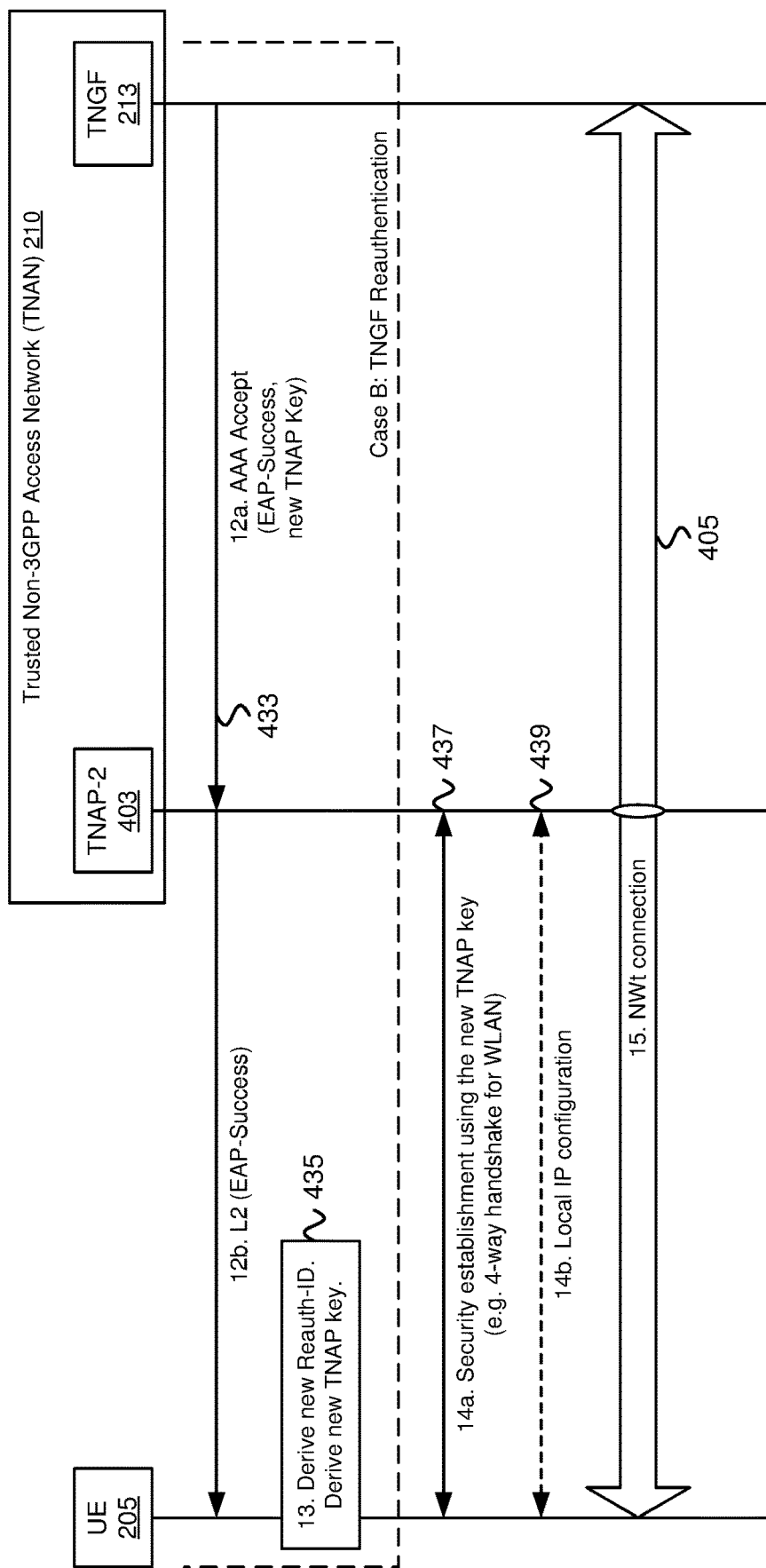
FIG. 4C is a continuation of the procedure depicted in FIG. 4B.

FIGS. 4A-4C depict a procedure 400 for supporting TNGF reauthentication, according to embodiments of the disclosure. The procedure 400 illustrates a first solution for TNGF reauthentication which involves the UE 205, a first TNAP ("TNAP-1") 401, a second TNAP ("TNAP-2") 403 and the TNGF 213 in the TNAN 210.

The procedure 400 represents a scenario where the UE 205 is connected to the TNGF 213 via the TNAP-1 401 and the UE decides to move from TNAP-1 401 to TNAP-2 403, e.g., due to radio conditions. The TNAP-2 403 is able to communicate with TNGF 213, so the TNGF does not change during this mobility procedure.

At FIG. 4A, the procedure 400 begins at step 0 as the UE 205 has established a first NWt connection 405 with the TNGF 213 via TNAP-1 401 and determines to move to TNAP-2 403 (see block 407).

At step 1 the UE 205 first establishes a L2 connection with the TNAP-2 403 (see messaging 409). At Steps 2-3, an EAP procedure is initiated, the TNAP-2 403 requests the UE Identity and the UE 205 sends a NAI as a response (see messaging 411-413).

Here, the NAI provided by the UE 205 indicates that the UE 205 Requests "TNGF Reauthentication" with the TNGF 213 by containing a reauthentication identity, e.g., NAI="<Reauth_ID>@nai.5gc.tngf<TNGF-ID>.mnc<MNC>.mcc<MCC>.3gppnetwork.org." The UE 205 sets the username to a Reauth-ID that is derived as discussed above with reference to Case A, e.g., using a TNGF-ID of the TNGF 213 ("TNGF-ID"), a TNonce, and a UNonce. The parameters used to derive the Reauth-ID are received when the UE 205 was first connected to TNGF 213, e.g., prior to establishing the first NWt connection 405. As discussed above, the UE 205 provides the NAI with username=Reauth-ID because the UE 205 does not want to initiate NAS signaling with 5GC 215, but it wants to reauthenticate with the TNGF 213.

At step 4a, the TNAP-2 403 selects TNGF 213 based on the TNGF ID in the received realm (see block 415). At step 4b, the TNAP-2 403 forwards the NAI to TNGF 213 in an AAA Request message (see messaging 417).

At step 5, the TNGF 213 finds a stored UE context containing the received Reauth-ID, thus, it determines that the UE 205 is a known UE which requests reauthentication. Therefore, the TNGF 213 initiates the Case B signaling as specified in the following steps. If the TNGF 213 cannot find a stored UE context containing the received Reauth-ID, then the TNGF 213 sends either an error response to UE 205, or it initiates the Case A signaling described above with reference to FIG. 2B and FIGS. 3A-3C.

The UE context was created in the TNGF 213 when the UE 205 performed an initial registration via TNGF 213 (see e.g., FIGS. 3A-3C). The UE context includes information associated with the UE 205 such as the Reauth-ID, a UE identity (e.g., 5G-GUTI), an AMF identity (AMF-ID), a TNGF key, a TNGF key lifetime, a TNAP key, an IPsec key, information about established PDU Sessions (PDU Session Resource List), etc.

Continuing on FIG. 4B, at step 6 the TNGF 213 initiates the Case B signaling (i.e., TNGF Reauthentication) by sending a 5G-Challenge packet to the UE 205 (see messaging 421). This packet contains a (new) TNonce value and a first Message Authentication Code ("MAC1") derived by using the TNGF key stored in the TNGF 213. As an example, the MAC1 can be derived as follows:

$$MAC1=KDF \text{ (TNGF key stored in TNGF, TNonce)}, \quad \text{Equation 2}$$

Note that the TNGF key stored in the TNGF 213 and the new TNonce are two inputs to the KDF. Additional parameters may be used for the MAC1 derivation, such as a Counter parameter, which is initialized in the UE 205 and in the TNGF 213 when the TNGF key is created (e.g., after the initial registration shown in FIGS. 3A-3C) and is increased in the UE 205 and in the TNGF 213 at every TNGF reauthentication procedure.

At step 7, the UE 205 derives an expected MAC1 value ("XMAC1") using the TNGF key stored in the UE 205 (see block 423). As an example, the XMAC1 can be derived as follows:

$$XMAC1=KDF \text{ (TNGF key stored in UE, TNonce)}, \quad \text{Equation 3}$$

Note that the TNGF key stored in the UE 205 and the newly received TNonce are two inputs to the KDF. Again, additional parameters may be used for the XMAC1 derivation, such as the Counter parameter referred to above. The UE 205 compares the derived XMAC1 with the received MAC1. If they match, then the TNGF 213 is authenticated by the UE 205, i.e., the TNGF 213 stores the same TNGF key as the TNGF key stored in the UE 205. Otherwise, the authentication fails.

At step 8, the UE 205 creates a (new) UNonce and derives a second message authentication code ("MAC2") using the TNGF key stored in the UE 205 (see block 425). As an example, the MAC2 can be derived as follows:

$$MAC2=KDF \text{ (TNGF key stored in UE, UNonce}\|\text{TNonce)}, \quad \text{Equation 4}$$

Note that the (TNGF key stored in UE) and the (UNonce||TNonce) are two inputs to the KDF, where the || symbol indicates concatenation. Here too, additional parameters may be used for the MAC2 derivation, such as the Counter parameter referred to above.

At step 9, the UE 205 responds with a 5G-Challenge containing UNonce, TNonce and MAC2 (see messaging 427). At step 10, the TNGF 213 derives an expected MAC2 ("XMAC2") using the TNGF key stored in the TNGF 213, UNonce and TNonce (see block 429).

As an example, the XMAC2 can be derived as follows:

$$XMAC2=KDF \text{ (TNGF key stored in TNGF, UNonce}\|\text{TNonce)}, \quad \text{Equation 5}$$

Note that the (TNGF key stored in TNGF) and the (UNonce||TNonce) are two inputs to the KDF, where the || symbol indicates concatenation. Again, additional parameters may be used for the XMAC2 derivation, such as the Counter parameter referred to above. The TNGF 213 compares the derived XMAC2 with the received MAC2. If they match, then the UE 205 is authenticated by TNGF 213, i.e., the UE 205 stores the same TNGF key as the TNGF key stored in the TNGF 213. Otherwise, the authentication fails.

At step 11, the TNGF 213 derives a fresh Reauth-ID for the UE 205, e.g., by using the Equation 1 (see block 431). Here, the new TNonce and UNonce values are input parameter for the KDF. In addition, the TNGF 213 derives a new TNAP key by using the TNGF key stored in TNGF 213, the TNGF ID and the TNonce, UNonce values.

Continuing on FIG. 4C, at step 12 the TNGF 213 completes the EAP-5G session by sending an EAP-Success packet to the UE 205 and the new TNAP key to TNAP-2 403 (see messaging 433).

At step 13, the UE 205 derives a new Reauth-ID, e.g., by using Equation 1 (see block 435). Here, the input parameters include the new TNonce and the new UNonce. Because the UE 205 and the TNGF 213 share the same TNGF key, the Reauth-ID derived independently in the UE 205 and in the TNGF 213 will be the same. In addition, the UE 205 also derives a new TNAP key (for TNAP-2 403) by using the same derivation formula used by the TNGF 213 in step 11.

At step 14a, the new TNAP key is applied to establish over-the-air security between the UE 205 and TNAP-2 403 (see messaging 437). At optional step 14b, if needed, the UE 205 may receive new IP configuration information (e.g., a new IP address, see messaging 439). At step 15, the UE resumes communication with TNGF 213 via TNAP-2 403 using the previously established NWt connection 405.

FIGS. 5A-5D depict a procedure 500 for supporting TNGF reauthentication, according to embodiments of the disclosure. The procedure 500 illustrates a second solution for TNGF reauthentication which involves the UE 205, the first TNAP ("TNAP-1") 401, the second TNAP ("TNAP-2") 403, a first TNGF ("TNGF1") 501 and a second TNGF ("TNGF2") 503 in the TNAN 210.

The procedure 500 represents a scenario where the UE 205 is connected to the TNGF1 501 via the TNAP-1 401 and the UE decides to move from TNAP-1 401 to TNAP-2 403, e.g., due to radio conditions. The procedure 500 handles the scenario where the UE 205 moves to a new TNAP (TNAP-2 403) that cannot support connectivity with the TNGF1 501 with which the UE 205 has already established a NWt connection 505. Because the TNAP-2 403 is unable to communicate with TNGF1 501, TNGF relocation is required during this mobility procedure.

Figure 5A:
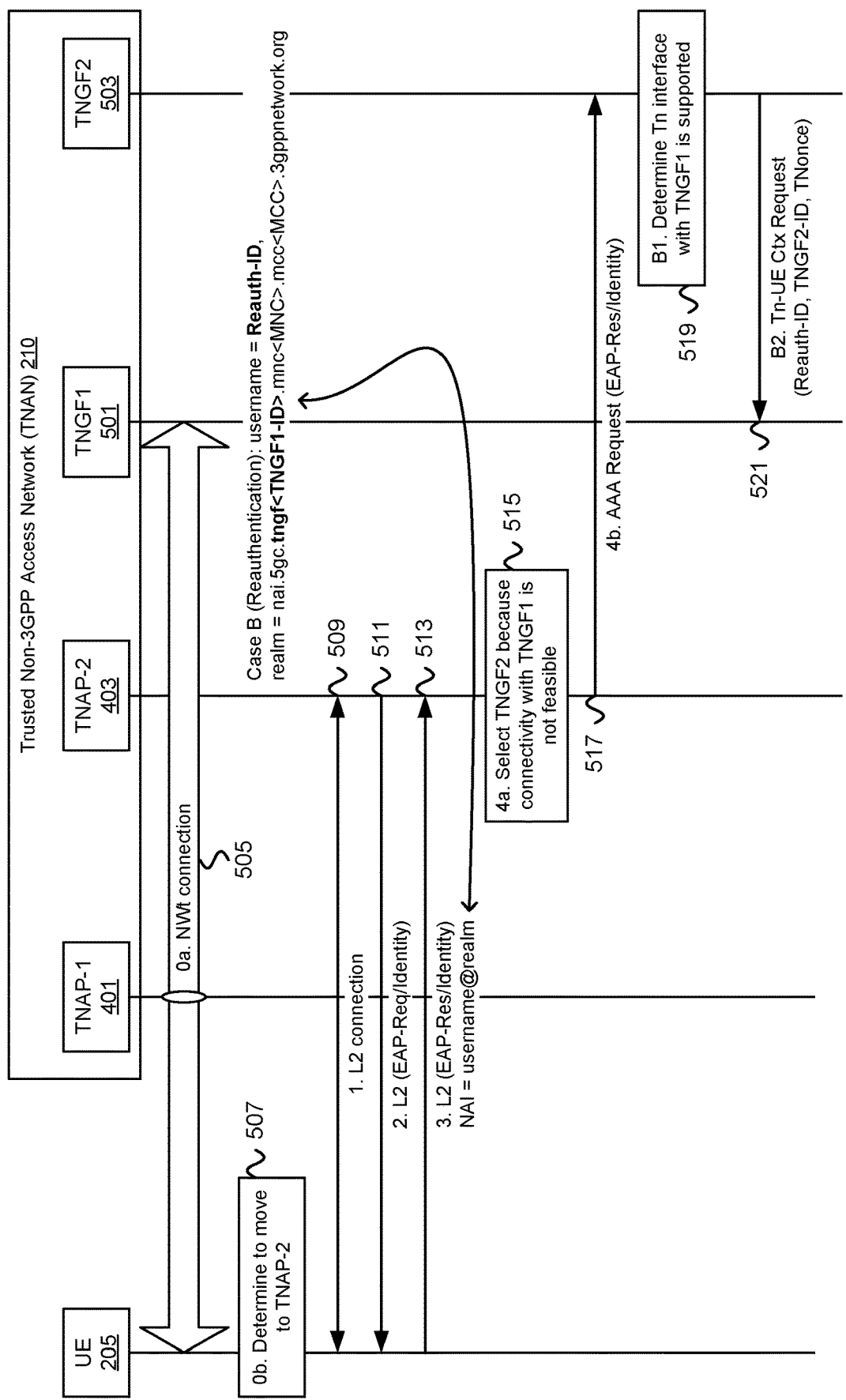
FIG. 5A is a signal flow diagram illustrating one embodiment of a second solution for TNGF reauthentication.

At FIG. 5A, the procedure 500 begins at step 0 as the UE 205 has established a first NWt connection 505 with the TNGF1 501 via TNAP-1 401 and determines to move to TNAP-2 403 (see block 507).

At step 1 the UE 205 first establishes a L2 connection with the TNAP-2 403 (see messaging 509). At Steps 2-3, an EAP procedure is initiated, the TNAP-2 403 requests the UE Identity and the UE 205 sends a NAI as a response (see messaging 511-513).

Here, the NAI provided by the UE 205 indicates that the UE 205 Requests "TNGF Reauthentication" with the TNGF1 501, e.g., NAI="<Reauth_ID>@nai.5gc.tngf<TNGF1-ID>.mnc<MNC>.mcc<MCC>.3gppnetwork.org." The UE 205 sets the username to a Reauth-ID that is derived as discussed above (see block 435 or block 347), e.g., using a TNGF-ID of the TNGF1 ("TNGF1-ID") 401, a TNonce, and a UNonce. The parameters used to derive the Reauth-ID are received when the UE 205 was first connected to TNGF1 501, e.g., prior to establishing the first NWt connection 505. As discussed above, the UE 205 provides the NAI with username=Reauth-ID because the UE 205 does not want to initiate NAS signaling with 5GC 215, but it wants to reauthenticate with the TNGF1 501.

At step 4a, the TNAP-2 403 selects a new TNGF (TNGF2 503) after examining the TNGF1-ID in the received realm and determining that it cannot support connectivity with the TNGF1 (see block 515). At step 4b, the TNAP-2 403 forwards the NAI to the selected TNGF2 503 in an AAA Request message (see messaging 517).

At step B1, the TNGF2 503 determines from the NAI received in step 4b (which includes TNGF1-ID) that the UE context resides in another TNGF (TNGF1 501) and discovers its IP address, e.g., using DNS. In the depicted scenario, the TNGF2 503 determines also that Tn signaling with TNGF1 501 via the Tn interface is supported (see block 519). At step B2, the TNGF2 503 sends a "Tn-UE Context Request" message to the TNGF1 501 containing the Reauth-ID received from the UE, a TNGF2 identity (TNGF2-ID) and a TNonce value (see messaging 521).

Continuing on FIG. 5B, at step 5 the TNGF1 501 applies the Reauth-ID to find the stored UE context of the UE 205 (see block 523). Upon finding the reference UE context, the TNGF1 501 determines that the UE 205 is a known UE. Therefore, at step B3 the TNGF1 501 responds with a "Tn-UE Context Response" message which contains the UE context (see messaging 525). Note that if the TNGF1 501 cannot find a stored UE context containing the received Reauth-ID, then the TNGF1 501 may send an error response to the TNGF2 503, which may then initiates the Case A signaling with the UE 205, described above with reference to FIG. 2B and FIGS. 3A-3C. In the depicted scenario is it assumed that the UE context of the UE 205 is stored in the TNGF1 501.

The Tn-UE Context Response message contains the UE identity of the UE 205 (e.g., 5G-GUTI or other identity), the identity of the AMF 301 (AMF-ID) serving the UE 205, and a modified TNGF key, referred to as "TNGF* key," which was derived using the TNGF key stored in TNGF1 501, the TNGF ID of the TNGF2 503 ("TNGF2-ID") and TNonce. As an example, the TNGF* key can be derived as follows:

TNGF* Key=KDF (TNGF key stored in TNGF1, TNGF2-ID||TNonce),  Equation 6

Note that the (TNGF key stored in the TNGF1 501) and the (TNGF2-ID||TNonce) are two inputs to the KDF, where the "||" symbol indicates concatenation. In addition, the Tn-UE Context Response message contains the PDU Session Resource List, which contains information about the PDU Sessions established by the UE 205 via the TNGF1 501.

At step 6a, the TNGF2 503 initiates a TNGF Reauthentication procedure (Case B signaling) by sending a 5G-Challenge packet to the UE 205 (see messaging 527). This packet contains the TNonce value included in step B2, a first Message Authentication Code (MAC1), the TNGF2 address and the TNGF2-ID. Because the UE 205 receives the TNGF2 address and the TNGF2-ID, it determines that the TNGF has changed.

The MAC1 can be derived, e.g., as described in Equation 2 with the TNGF* key replacing the parameter TNGF key as an input for the KDF. In certain embodiments, another nonce value created by TNGF2 503 may be used as an input for the KDF (e.g., concatenated with or replacing the TNonce sent in step B2). As discussed above, additional parameters may be used for the MAC1 derivation, such as a Counter parameter which is initialized in the UE 205 and in the TNGF1 501 when the first TNGF key is created (e.g., after the initial registration shown in FIGS. 3A-3C) and is increased at every TNGF reauthentication procedure, etc. In such embodiments, the Counter parameter is included in the UE context.

At step B4, the UE 205 applies the TNonce (and/or additional parameters) to derive the new TNGF key (i.e., TNGF* key) for the new TNGF (TNGF2 503) by using the Equation 6 by replacing the parameter "TNGF key stored in the TNGF1" with the TNGF key stored in the UE 205 (see block 529).

At step 7, the UE 205 derives an expected MAC1 value ("XMAC1") using the TNGF* key stored in the UE 205, e.g., using Equation 3 with the TNGF* key replacing the parameter TNGF key as an input for the KDF (see block 531).

At step 8, the UE 205 creates a (new) UNonce and derives a second message authentication code ("MAC2") using the TNGF* key stored in the UE 205, e.g., according to Equation 4 with the TNGF* key replacing the parameter "TNGF key stored in UE" as an input for the KDF (see block 533).

Continuing on FIG. 5C, at step 9 the UE 205 responds with a 5G-Challenge containing UNonce, TNonce and MAC2 (see messaging 535). At step 10, the TNGF2 503 derives an expected MAC2 ("XMAC2") using the TNGF* key stored in the TNGF2 503, e.g., according to Equation 5 with the TNGF* key replacing the parameter "TNGF key stored in UE" as an input for the KDF (see block 537).

At step 11, the TNGF2 503 derives new keys and identifiers (see block 539). The TNGF2 derives a fresh Reauth-ID for the UE 205, e.g., by using the Equation 1 with the TNGF* key replacing the parameter TNGF key as an input for the KDF. Here, the TNGF-ID of TNGF2 503 and new TNonce and UNonce values are input parameter for the KDF. In addition, the TNGF2 503 derives a new IPsec key and a new TNAP key by using the TNGF* key stored in TNGF2 503, the TNGF ID and the TNonce, UNonce values.

At step 12, the TNGF2 503 completes the EAP-5G session by sending an EAP-Success packet to the UE 205 and the new TNAP key to TNAP-2 403 (see messaging 541).

At step 13, the UE 205 derives a new Reauth-ID, e.g., by using Equation 1 with the TNGF* key replacing the parameter TNGF key as an input for the KDF (see block 543). Here, the input parameters include the TNGF-ID of TNGF2

503, the new TNonce and the new UNonce. Because the UE 205 and the TNGF2 503 share the same TNGF key, the Reauth-ID derived independently in the UE 205 and in the TNGF2 503 will be the same. In addition, the UE 205 also derives a new TNAP key (for TNAP-2 403) and a new IPsec key by using the same derivation formulas used by the TNGF2 503 in step 11.

At step 14a, the new TNAP key is applied to establish over-the-air security between the UE 205 and TNAP-2 403 (see messaging 437). At optional step 14b, if needed, the UE 205 may receive new IP configuration information (e.g., a new IP address, see messaging 439).

Figure 5D:
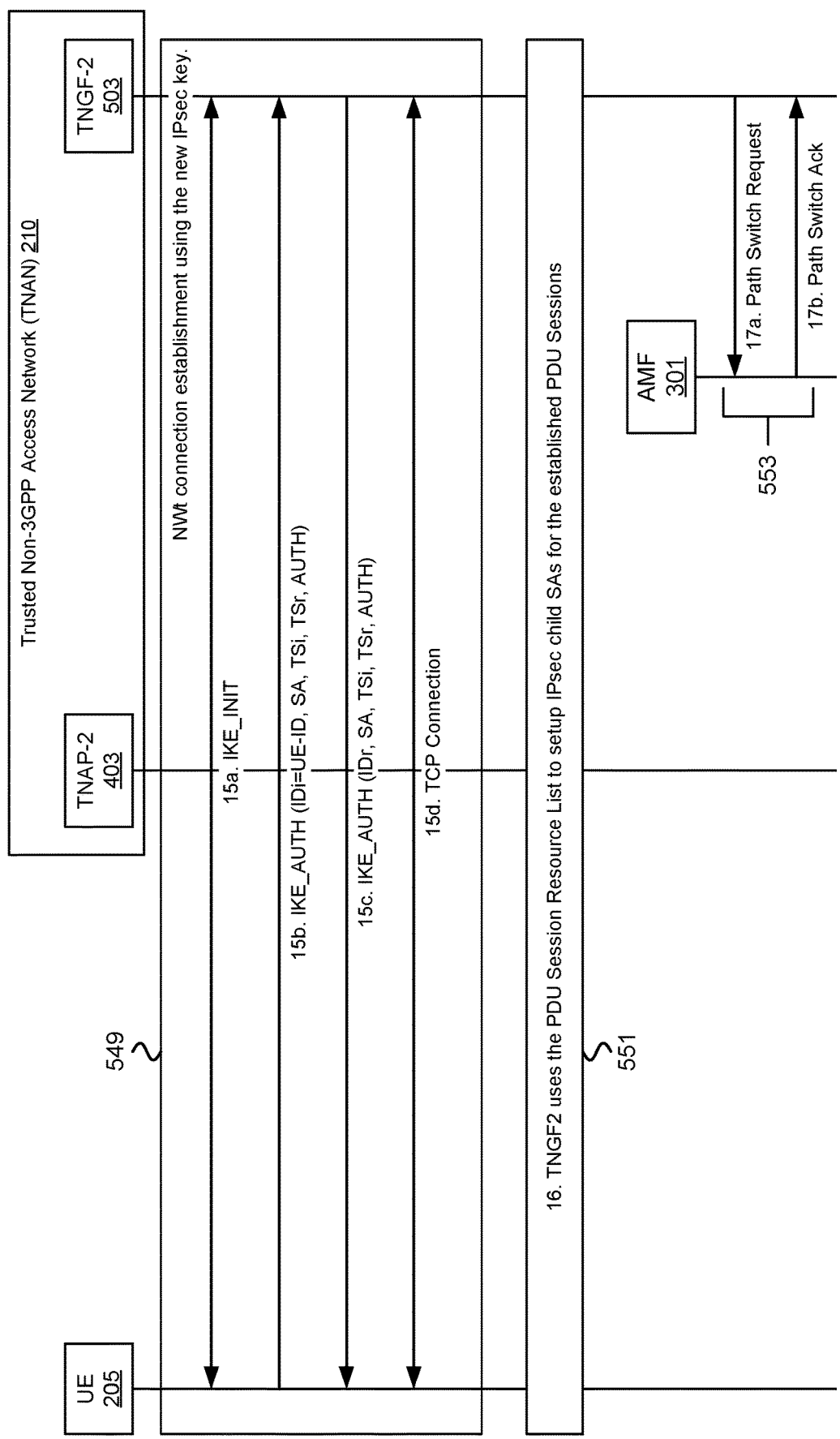
FIG. 5D is a continuation of the procedure depicted in FIG. 5C.

Continuing on FIG. 5D, at step 15 the UE 205 starts the establishment of a new IPsec SA with TNGF2 503 by using the received TNGF2 address. The AUTH payload in steps 15b and 15c is derived by using the IPsec key in the UE 205 and the IPsec key in the TNGF2 503, respectively. If these IPsec keys match, then the UE 205 and the TNGF2 503 are mutually authenticated and the IPsec SA is successfully established. Subsequently, the UE 205 sets up a TCP connection with the TNGF2 503, and the NWt connection establishment 549 is completed.

At step 16, the TNGF2 503 applies the received PDU Session Resource List to setup IPsec child SAs for the established PDU Sessions of the UE 205. At step 17, the AMF 301 is informed that the TNGF has changed by the sending of a Path Switch Request from the TNGF2 503 to the AMF 301 (see messaging 553).

Figure 6A:
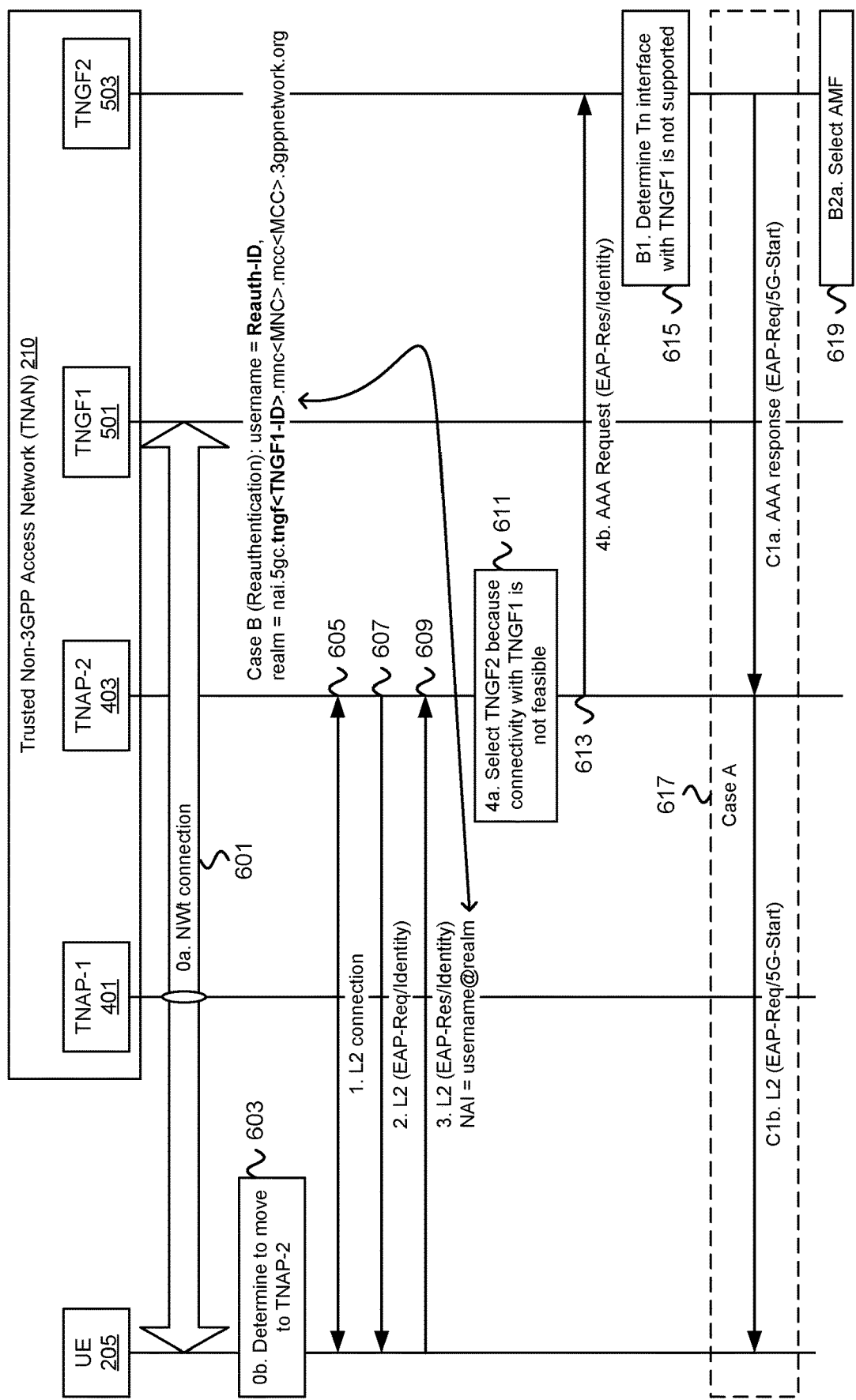
FIG. 6A is a signal flow diagram illustrating one embodiment of a third solution for TNGF reauthentication.
Figure 6B:
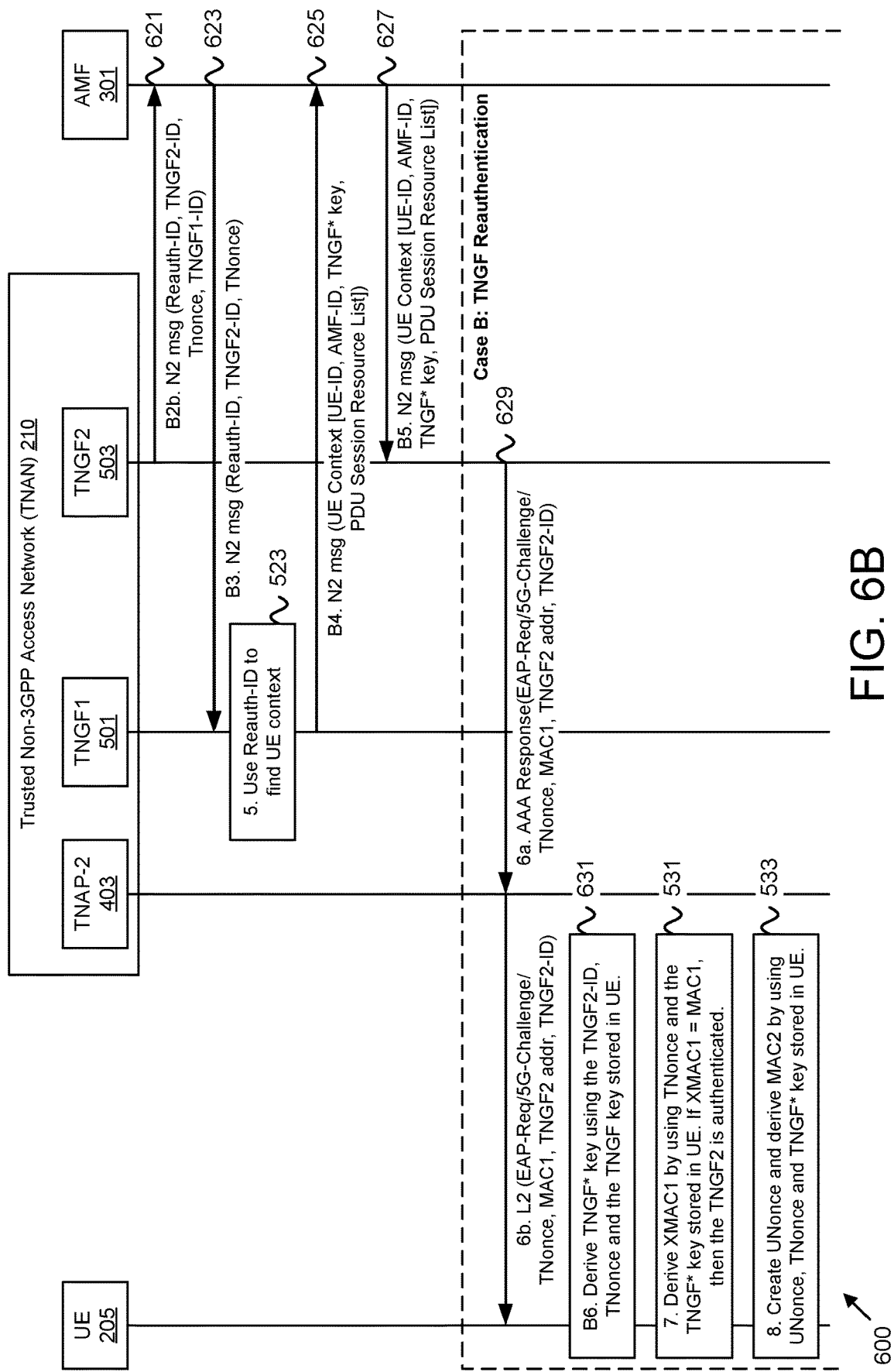
FIG. 6B is a continuation of the procedure depicted in FIG. 6A.

FIGS. 6A-6B depict a procedure 600 for supporting TNGF reauthentication, according to embodiments of the disclosure. The procedure 600 illustrates a third solution for TNGF reauthentication which involves the UE 205, the first TNAP ("TNAP-1") 401, the second TNAP ("TNAP-2") 403, a first TNGF ("TNGF1") 501 and a second TNGF ("TNGF2") 503 in the TNAN 210, and the AMF 301 in the 5G core network 215.

The procedure 600 represents a scenario where the UE 205 is connected to the TNGF1 501 via the TNAP-1 401 and the UE decides to move from TNAP-1 401 to TNAP-2 403, e.g., due to radio conditions. The procedure 600 handles the scenario where the TNAP-2 403 cannot support connectivity with the TNGF1 501 with which the UE 205 has already established a NWt connection 601. Because the TNAP-2 403 is unable to communicate with TNGF1 501, TNGF relocation is required during this mobility procedure. However, in this scenario Tn signaling is not supported between TNGF1 501 and TNGF2 503.

At FIG. 6A, the procedure 600 begins at step 0 as the UE 205 has established a first NWt connection 601 with the TNGF1 501 via TNAP-1 401 and determines to move to TNAP-2 403 (see block 603).

At step 1 the UE 205 first establishes a L2 connection with the TNAP-2 403 (see messaging 605). At Steps 2-3, an EAP procedure is initiated, the TNAP-2 403 requests the UE Identity and the UE 205 sends a NAI as a response (see messaging 607-609).

Here, the NAI provided by the UE 205 indicates that the UE 205 Requests "TNGF Reauthentication" with the TNGF1 501, e.g., NAI="<Reauth_ID>@nai.5gc.tngf<TNGF1-ID>.mnc<MNC>.mcc<MCC>.3gppnetwork.org." The UE 205 sets the username to a Reauth-ID that is derived as discussed above. The parameters used to derive the Reauth-ID are received when the UE 205 was first connected to TNGF1 501, e.g., prior to establishing the first NWt connection 601. As discussed above, the UE 205 provides the NAI with username=Reauth-ID because the UE 205 does not want to initiate NAS signaling with 5GC 215, but it wants to reauthenticate with the TNGF1 501.

At step 4a, the TNAP-2 403 selects a new TNGF (TNGF2 503) after examining the TNGF1-ID in the received realm and determining that it cannot support connectivity with TNGF1 (see block 611). At step 4b, the TNAP-2 403 forwards the NAI to the selected TNGF2 503 in an AAA Request message (see messaging 613).

At step B1, the TNGF2 503 determines from the NAI received in step 4b (which includes TNGF1-ID) that the UE context resides in another TNGF (TNGF1 501) and discovers its IP address, e.g., using DNS. In the depicted scenario, the TNGF2 503 determines also that Tn signaling with TNGF1 501 via the Tn interface is not supported (see block 615).

In this situation, the TNGF2 503 may implement one of the following two alternatives. According to Option 1, the TNGF2 503 sends an EAP/5G-Start packet to the UE, thus triggering NAS signaling according to Case A (see Steps C1, messaging 617). According to Option 2, the TNGF2 503 performs TNGF Reauthentication according to Case B, using the 5GC 215 to retrieve UE context from the TNGF1 501, as explained below. Note that in Option 1, the UE 205 would send a Registration Request message, the TNGF2 503 would select an AMF (the same AMF 301 or a different one), and the Registration procedure shown in FIGS. 3A-3C take place.

However, with Option 2, at step B2a the TNGF2 503 selects an AMF (see block 619). Here it is assumed that the same AMF 301 used by TNGF1 501 is selected; however, in alternative embodiments another AMF in the 5GC 215 may be selected.

Continuing at FIG. 6B, at step B2b the TNGF2 503 sends a first N2 message to the AMF 301 containing the Reauth-ID received from the UE 205, the identity of the TNGF2 503 (i.e., "TNGF2-ID"), a TNonce and the identity of the TNGF1 501 (i.e., "TNGF1-ID"), which is required in case a different AMF is selected in step B2a (see messaging 621).

At step B3, the AMF 301 sends a second N2 message to the TNGF1 501 (see messaging 623). The AMF 301 identifies the TNGF1 501 using the TNGF1-ID parameter and forwards the Reauth-ID, TNGF2-ID and TNonce, similar to Step B2 in FIG. 5A.

At step 5, the TNGF1 501 applies the Reauth-ID to find the stored UE Context, as described in step 5 in FIG. 5B (see block 523).

At step B4, the TNGF1 501 responds with a third N2 message including the stored UE Context which contains the UE identity, the identity of the AMF serving the UE (AMF-ID) and a TNGF* key, which was derived using the TNGF key stored in TNGF1, the TNGF2-ID and TNonce (see messaging 625). In addition, the UE Context includes the PDU Session Resource List, which contains information about the PDU Sessions established by the UE 205 via TNGF1 501. The TNGF* key may be derived using Equation 6, as described in step B3 in FIG. 5B.

At step B5, the AMF 301 relays the UE Context received from the TNGF1 501 to the TNGF2 503 (see messaging 627). Note that the N2 messages in steps B2b, B3, B4 and B5 are new messages (i.e., not previously defined) send via the N2 reference points interfacing the TNGFs with the AMF. The present disclosure uses the general term "N2 msg" to refer to these messages.

At step 6, the TNGF2 503 initiates a TNGF Reauthentication procedure (Case B signaling) by sending a 5G-Challenge packet to the UE 205 (see messaging 629). This packet contains the TNonce value included in step B2b, a first Message Authentication Code (MAC1), the TNGF address of TNGF2 503 (i.e., "TNGF2 address") and the TNGF2-ID. Because the UE 205 receives the TNGF2 address and the TNGF2-ID, it determines that the serving TNGF has changed. The MAC1 can be derived using Equation 2 above with the TNGF* key replacing the parameter "TNGF key stored in TNGF" as an input for the KDF. Again, additional parameters may be used for the MAC1 derivation, such as another nonce value created by TNGF2 503, or the Counter parameter referred to above, which is increased at every TNGF reauthentication procedure, etc.

At step B6, the UE 205 applies the TNonce to derive the new TNGF key (TNGF* key) for the new TNGF by using the equation 6, where the parameter "TNGF key stored in TNGF1" is replaced with the TNGF key stored in UE 205 (see block 631). At step 7, the UE 205 derives the XMAC1 using the TNonce and TNGF* key stored in the UE, as described above (see block 531). If the XMAC1 value matches the received MAC1 value, then the TNGF2 503 is authenticated by the UE 205.

At step 8, the UE 205 creates a new UNonce and derives a MAC2 value using the UNonce, TNonce and TNGF* key stored in the UE, as describe above (see block 533). The procedure 600 completes the TNGF Reauthentication procedure (Case B signaling) and subsequent NWt establishment with the steps shown in FIGS. 5C and 5D and described above. In other words, the procedure 600 continues at FIG. 5C.

Figure 7:
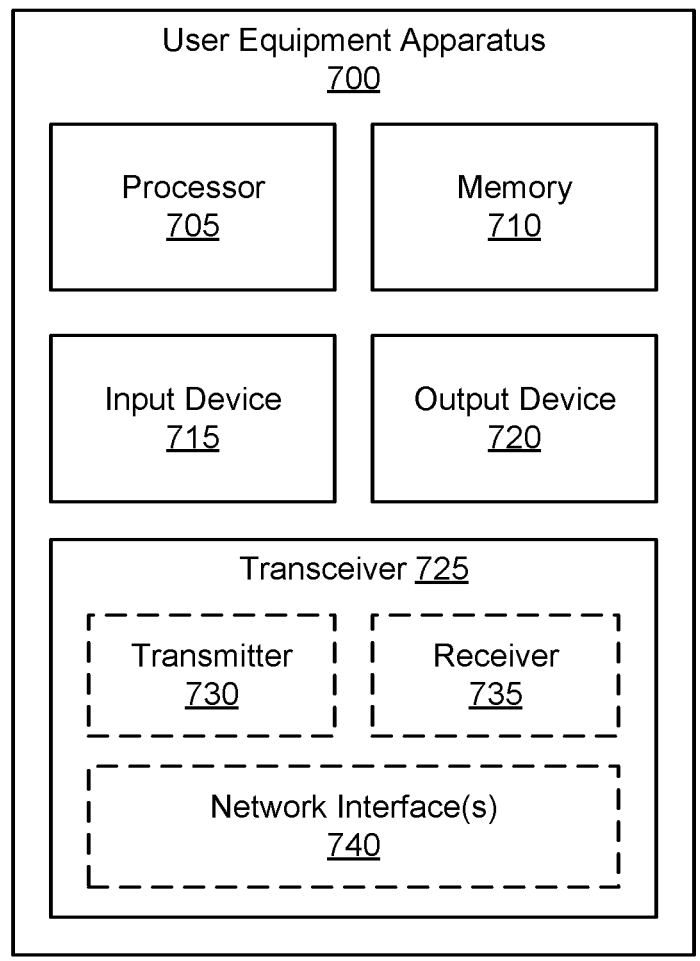
FIG. 7 is a block diagram illustrating one embodiment of a user equipment apparatus that supports TNGF reauthentication.

FIG. 7 depicts one embodiment of a user equipment apparatus 700, according to embodiments of the disclosure. The user equipment apparatus 700 may be one embodiment of the remote unit 105 and/or the UE 205. Furthermore, the user equipment apparatus 700 may include a processor 705, a memory 710, an input device 715, an output device 720, a transceiver 725. In some embodiments, the input device 715 and the output device 720 are combined into a single device, such as a touch screen. In certain embodiments, the user equipment apparatus 700 does not include any input device 715 and/or output device 720.

As depicted, the transceiver 725 includes at least one transmitter 730 and at least one receiver 735. Here, the transceiver 725 communicates with a mobile core network (e.g., a 7GC) via an access network. Additionally, the transceiver 725 may support at least one network interface 740. Here, the at least one network interface 740 facilitates communication with an TNGF (e.g., using the "NWt" interface). Additionally, the at least one network interface 740 may include an interface used for communications with an AMF, an SMF, and/or a UPF.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the user equipment apparatus 700 to implement the above described UE behaviors. In some embodiments, the processor 705 establishes connectivity with a first access point in the non-3GPP access network. Here, the first access point initiates an EAP session to authenticate the user equipment apparatus 700.

The processor 705 sends a first EAP message containing a NAI (e.g., the EAP-Response/Identity packet of FIG. 2A, Step 3). If the NAI indicates that the user equipment apparatus 700 requests to reauthenticate with a TNGF in the non-3GPP access network, then the processor 705 receives a first EAP challenge packet used to authenticate the TNGF. If the NAI indicates that the user equipment apparatus 700 request to initiate a NAS signaling procedure with a mobile communication network, then the processor 705 receives an EAP start packet. Here, the EAP start packet triggers the processor 705 to send a first NAS message to the mobile communication network. The processor 705 completes an EAP session using the first EAP authentication method with the TNGF. Here, the first EAP authentication method is initiated by one of the first EAP challenge packet and the EAP start packet.

Here, the EAP session carries an inner EAP authentication method. In one embodiment, the EAP session with inner EAP authentication comprises an EAP session with EAP-AKA authentication method. In another embodiment, the EAP session with inner EAP authentication comprises an EAP session with EAP-TLS authentication method. In other embodiments, the EAP session with inner EAP authentication comprises an EAP session with EAP-5G authentication method. The EAP session and the inner EAP authentication method are both completed with an EAP-Success (or EAP-Failure) packet.

In some embodiments, the first EAP message comprises an identity for the mobile communication network and an identity of the TNGF. Here, the user equipment apparatus 700 is connected to the TNGF and the TNGF relays NAS messages between the user equipment apparatus 700 and the mobile communication network. In certain embodiments, the NAS signaling procedure comprising one of: a NAS Registration Request procedure and a NAS Service Request procedure.

In some embodiments, the NAI indicates that the user equipment apparatus 700 requests to reauthenticate with the TNGF by including a reauthentication identifier in the NAI. In some embodiments, the NAI indicates that the user equipment apparatus 700 requests to reauthenticate with the TNGF in response to determining that reconnection to the TNGF is to be established via a second access point.

In some embodiments, the first EAP challenge packet contains a first set of parameters (e.g., TNonce, MAC1), wherein the processor 705 uses the first set of parameters and a TNGF key stored in the user equipment apparatus 700 to authenticate the TNGF. In some embodiments, the first set of parameters includes a first nonce and a first message authentication code (MAC1) used to authenticate the TNGF, wherein the processor 705 authenticates the first message authentication code using the first nonce (e.g., TNonce) and a TNGF key stored in the memory 710.

In various embodiments, the processor 705 sends a second EAP challenge packet in response to successfully authenticating the TNGF, wherein the second EAP challenge packet includes a second nonce (e.g., UNonce) and a second message authentication code (MAC2) derived by using the TNGF key stored in the memory 710, the second nonce, and at least one of the first set of parameters (e.g., TNonce).

In certain embodiments, the processor 705 completes the EAP session using the first EAP authentication method by sending the second EAP challenge packet and receiving an EAP success packet. Here, the TNGF sends the EAP success packet in response to successfully authenticating the user equipment apparatus 700 using the second EAP challenge packet. In certain embodiments, the processor 705 completes the EAP session using the first EAP authentication method by sending the second EAP challenge packet and receiving an EAP failure packet. Here, the TNGF sends the EAP failure packet in response to unsuccessfully authenticating the user equipment apparatus 700 using the second EAP challenge packet.

In some embodiments, the processor 705 derives a new reauthentication identifier of the user equipment apparatus 700 using the second nonce and at least one of the first set parameters, wherein the processor 705 further derives a new TNAP key using the second nonce and at least one of the first set parameters, and wherein the processor 705 uses the new TNAP key to establish a security association with the second access point.

In some embodiments, the first set of parameters further includes a TNGF identity (e.g., TNGF2-ID) and a network address of the TNGF (e.g., TNGF2 Address), wherein at least one of the TNGF identity and the network address indicate a change in serving TNGF. In certain embodiments, the processor 705 derives a second TNGF key (e.g., TNGF* key) using the TNGF key stored in the memory 710, the first nonce, and the network address of the user equipment apparatus 700. In such embodiments, the processor 705 authenticates the first message authentication code (MAC1) using the first nonce (e.g., TNonce) and the second TNGF key.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data relating to supporting TNGF reauthentication, for example storing security keys, IP addresses, and the like. In certain embodiments, the memory 710 also stores program code and related data, such as an operating system ("OS") or other controller algorithms operating on the user equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an ASIC, or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
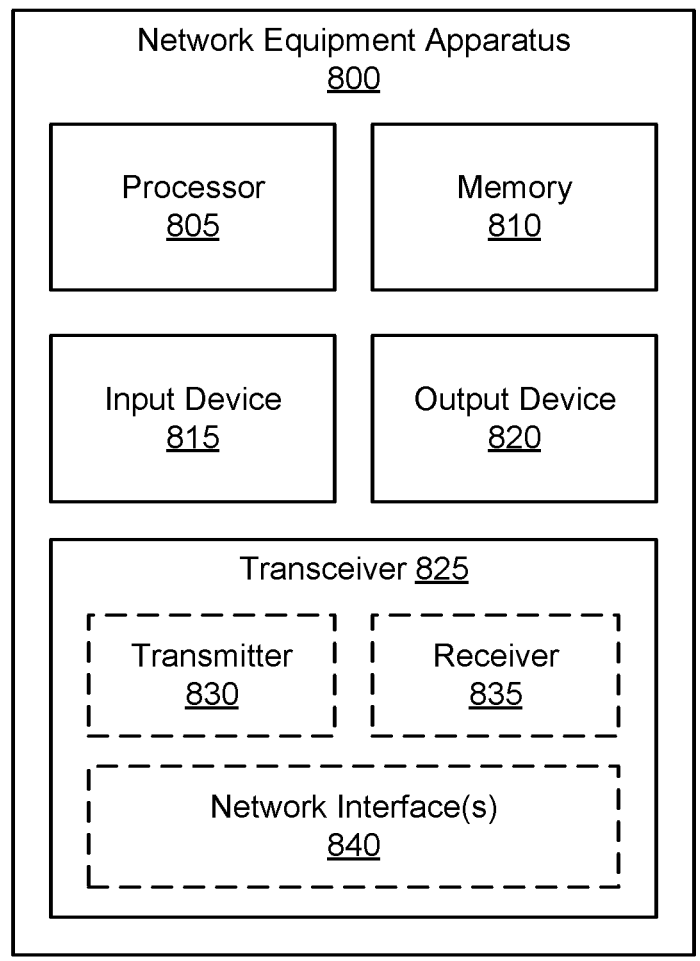
FIG. 8 is a block diagram illustrating one embodiment of a network equipment apparatus that supports TNGF reauthentication.

FIG. 8 depicts one embodiment of a network equipment apparatus 800, according to embodiments of the disclosure. In some embodiments, the network equipment apparatus 800 may be one embodiment of a TNGF (i.e., TNGF1 and/or TNGF2). In other embodiments, the network equipment apparatus 800 may be one embodiment of an AMF. Furthermore, network equipment apparatus 800 may include a processor 805, a memory 810, an input device 815, an output device 820, a transceiver 825. In some embodiments, the input device 815 and the output device 820 are combined into a single device, such as a touch screen. In certain embodiments, the network equipment apparatus 800 does not include any input device 815 and/or output device 820.

As depicted, the transceiver 825 includes at least one transmitter 830 and at least one receiver 835. Here, the transceiver 825 communicates with one or more remote units 105. Additionally, the transceiver 825 may support at least one network interface 840, such as the NWt, N2, and N3 interfaces depicted in FIG. 1. In some embodiments, the transceiver 825 supports a first interface for communicating with a RAN node, a second interface for communicating with one or more network functions in a mobile core network (e.g., a 8GC) and a third interface for communicating with a remote unit (e.g., UE).

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the first transceiver 825.

In various embodiments, the processor 805 controls the network equipment apparatus 800 to implement the above described TNGF1 behaviors. In some embodiments, the processor 805 receives a first EAP message from the UE containing a NAI and sends a first EAP challenge packet in response to the NAI indicating that the UE requests to reauthenticate with the TNGF1. Here, the first EAP challenge packet is used to authenticate the TNGF1 with the UE.

The processor 805 sends an EAP start packet to the UE in response to the NAI indicating that the UE requests to initiate a NAS signaling procedure with the mobile communication network. Here, the EAP start packet triggers the UE to send a first NAS message to the mobile communication network. The processor 805 completes an EAP session with the UE using the first EAP authentication method. Here, the first EAP authentication method is initiated by one of the first EAP challenge packet and the EAP start packet.

In some embodiments, the first EAP challenge packet contains a first set of parameters. Here, the first set of parameters including a first nonce and a first message authentication code (MAC1) derived by using the first nonce (e.g., TNonce) and a TNGF key stored in the memory 810. In such embodiments, the UE uses the first message authentication code to authenticate the TNGF1.

In some embodiments, the processor 805 receives a second EAP challenge packet from the UE. Here, the UE sends the second EAP challenge packet in response to successfully authenticating the first EAP challenge packet. In such embodiments, the second EAP challenge packet includes a second nonce (e.g., UNonce) and a second message authentication code (MAC2) derived by using the TNGF key stored in the UE, the second nonce, and at least one of the first set of parameters (e.g., TNonce).

In various embodiments, the processor 805 further authenticates the UE using the second EAP challenge packet. In certain embodiments, the processor 805 further authenticates the UE using the second EAP challenge packet, wherein the processor 805 completes the EAP session using the first EAP authentication method by sending an EAP failure packet in response to unsuccessfully authenticating the UE.

In some embodiments, the processor 805 completes the EAP session using the first EAP authentication method by sending an EAP success packet in response to successfully authenticating the UE. In some embodiments, the processor 805 derives a new reauthentication identifier of the UE in response to successfully authenticating the UE using the second nonce and at least one of the first set parameters. Additionally, the processor 805 derives a new TNAP key using the second nonce and at least one of the first set parameters. In such embodiments, the UE uses the new TNAP key to protect communication on an air interface.

In various embodiments, the NAI indicates that the UE requests to reauthenticate with the TNGF1 by including a reauthentication identifier in the NAI.

In some embodiments, the UE reauthenticates with a TNGF different than the network equipment apparatus 800. In such embodiments, the processor 805 generates a UE context for a UE in response to successful authentication of the UE with the mobile communication network and receives a first request for the UE context from a first network function (e.g., TNGF2 or AMF). Here, the first request includes a first set of parameters (e.g., Reauth-ID, TNGF2-ID, TNonce), the first request indicating that a target gateway function (e.g., TNGF2) is to serve the UE.

The processor 805 derives a first security key (e.g., TNGF* key) using at least one of the first set of parameters and a second security key (e.g., TNGF key) stored in the UE context. Via the network interface 840, the processor 805 sends a modified UE context to the first network function, the modified UE context including the first security key.

In some embodiments, the processor 805 generates a reauthentication identity of the UE in response to successful authentication of the UE with the mobile communication network, wherein the first set of parameters includes the reauthentication identity of the UE, a first nonce (e.g., TNonce) and the gateway function identity of the target gateway function.

In some embodiments, the modified UE context further includes a UE identity of the UE, an identity of an AMF serving the UE, and a PDU session resource list. In certain embodiments, the first network function is the target gateway function. In other embodiments, the first network function is an AMF serving the UE.

In various embodiments, the processor 805 controls the network equipment apparatus 800 to implement the above described TNGF2 behaviors. In such embodiments, the processor 805 receives a first EAP message containing a NAI (e.g., the EAP-Response/Identity packet of FIG. 2A, Step 3) from the UE. Here, the NAI indicates that the UE requests to reauthenticate with a source gateway function (e.g., TNGF1). The processor 805 receives a UE context of the UE and derives a first EAP challenge packet using the UE context. Via the network interface 840, the processor 805 sends the first EAP challenge packet to the UE. Here, the first EAP challenge packet is used to authenticate the TNGF2 with the UE.

In some embodiments, the processor 805 determines whether the TNGF2 supports signaling exchange (e.g., a Tn interface) with the source gateway function. In some embodiments, receiving the UE context includes requesting the UE context of the UE from the source gateway function in response to the TNGF2 supporting signaling exchange with the source gateway function. In certain embodiments, the processor 805 requests the UE context of the UE by sending a first request to the source gateway function. Here, the first request contains a first set of parameters (e.g., Reauth-ID, TNGF2-ID, TNonce) including a gateway function identity of the TNGF2 and a reauthentication identity. In such embodiments, the reauthentication identity is used to identify the UE context stored in the source gateway function.

In some embodiments, receiving the UE context includes requesting the UE context from an AMF in the mobile communication network in response to the TNGF2 not supporting connectivity with the source gateway function. In certain embodiments, the processor 805 requests the UE context of the UE by sending a second request to the AMF. Here, the second request contains a first set of parameters (e.g., Reauth-ID, TNGF2-ID, TNonce) including a gateway function identity of the TNGF2, a gateway identity of the source gateway function and a reauthentication identity. In such embodiments, the reauthentication identity is used to identify the UE context stored in the source gateway function.

In some embodiments, the NAI indicates that the UE requests to reauthenticate with a gateway function by including a reauthentication identifier in the NAI. In some embodiments, the EAP challenge packet includes a first set of parameters and the UE context includes a source TNGF key (e.g., the TNGF* key) derived from a second TNGF key (e.g., the TNGF key) stored in the source gateway function and at least one of the first set of parameters.

In some embodiments, the first set of parameters includes a gateway function identity, a first nonce, and a first message authentication code (e.g., MAC1) derived by using the first nonce (e.g., a TNonce) and the source TNGF key. Here, the UE uses the first message authentication code to authenticate the TNGF2. In certain embodiments, the first EAP challenge packet further contains a network address of the TNGF2. Here, at least one of the gateway function identity and the network address indicate a change in serving gateway function to the UE.

In certain embodiments, the processor 805 receives a second EAP challenge packet from the UE, the UE sending the second EAP challenge packet in response to successfully authenticating the TNGF2. In such embodiments, the second EAP challenge packet includes a second nonce (e.g., a UNonce) and a second message authentication code (e.g., MAC2) derived by using the source TNGF key in the UE, the second nonce and at least one of the first set of parameters (e.g., a TNonce). In various embodiments, the processor 805 further authenticates the UE using the second EAP challenge packet.

In some embodiments, the processor 805 completes the EAP session using the first EAP authentication method by sending an EAP success packet in response to successfully authenticating the UE. In such embodiments, the processor 805 further derives a new TNAP key, a new IPsec key and a reauthentication identifier of the UE in response to successfully authenticating the UE. In one embodiment, the processor 805 derives the TNAP key using the second nonce (e.g., UNonce) and at least one parameter from the first set of parameters. In one embodiment, the processor 805 derives the reauthentication identifier using the second nonce (e.g., UNonce) and at least one parameter from the first set of parameters. In certain embodiments, the UE context includes a PDU session resource list. In such embodiments, the processor establishes an IPsec connection (e.g., NWt connection) with the UE using the IPsec key, and establishes at least one child security association with the UE using the PDU session resource list in response to establishing the IPsec connection.

In some embodiments, the processor 805 further authenticates the UE using the second EAP challenge packet. In such embodiments, the processor 805 completes the EAP session using the first EAP authentication method by sending an EAP failure packet in response to unsuccessfully authenticating the UE.

In various embodiments, the processor 805 controls the network equipment apparatus 800 to implement the above described AMF behaviors. In some embodiments, the processor 805 receives a first request for the UE context of the UE from a target gateway function (e.g., TNGF2), the first request identifying a source gateway function (e.g., TNGF1). Here, the first request includes a first set of parameters.

The processor 805 sends a second request to the source gateway function, the second request indicating that the target gateway function is to serve the UE. Here, the second request also includes the first set of parameters. Via the network interface 840, the processor 805 receives the UE context from the source gateway function and relays the UE context to the target gateway function.

In some embodiments, the first set of parameters includes a reauthentication identity of the UE and a gateway function identity of the target gateway function. In some embodiments, the UE context includes a UE identity of the UE, an identity of the AMF (e.g., AMF-ID), a first TNGF key, and a PDU session resource list.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data relating to supporting TNGF reauthentication, for example storing security keys, IP addresses, UE contexts, and the like. In certain embodiments, the memory 810 also stores program code and related data, such as an operating system ("OS") or other controller algorithms operating on the network equipment apparatus 800 and one or more software applications.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, may include any known electronically controllable display or display device. The output device 820 may be designed to output visual, audible, and/or haptic signals. In some embodiments, the output device 820 includes an electronic display capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, all or portions of the output device 820 may be located near the input device 815.

As discussed above, the transceiver 825 may communicate with one or more remote units and/or with one or more interworking functions that provide access to one or more PLMNs. The transceiver 825 may also communicate with one or more network functions (e.g., in the mobile core network 140). The transceiver 825 operates under the control of the processor 805 to transmit messages, data, and other signals and also to receive messages, data, and other signals. For example, the processor 805 may selectively activate the transceiver (or portions thereof) at particular times in order to send and receive messages.

The transceiver 825 may include one or more transmitters 830 and one or more receivers 835. In certain embodiments, the one or more transmitters 830 and/or the one or more receivers 835 may share transceiver hardware and/or circuitry. For example, the one or more transmitters 830 and/or the one or more receivers 835 may share antenna(s), antenna tuner(s), amplifier(s), filter(s), oscillator(s), mixer(s), modulator/demodulator(s), power supply, and the like. In one embodiment, the transceiver 825 implements multiple logical transceivers using different communication protocols or protocol stacks, while using common physical hardware.

Figure 9:
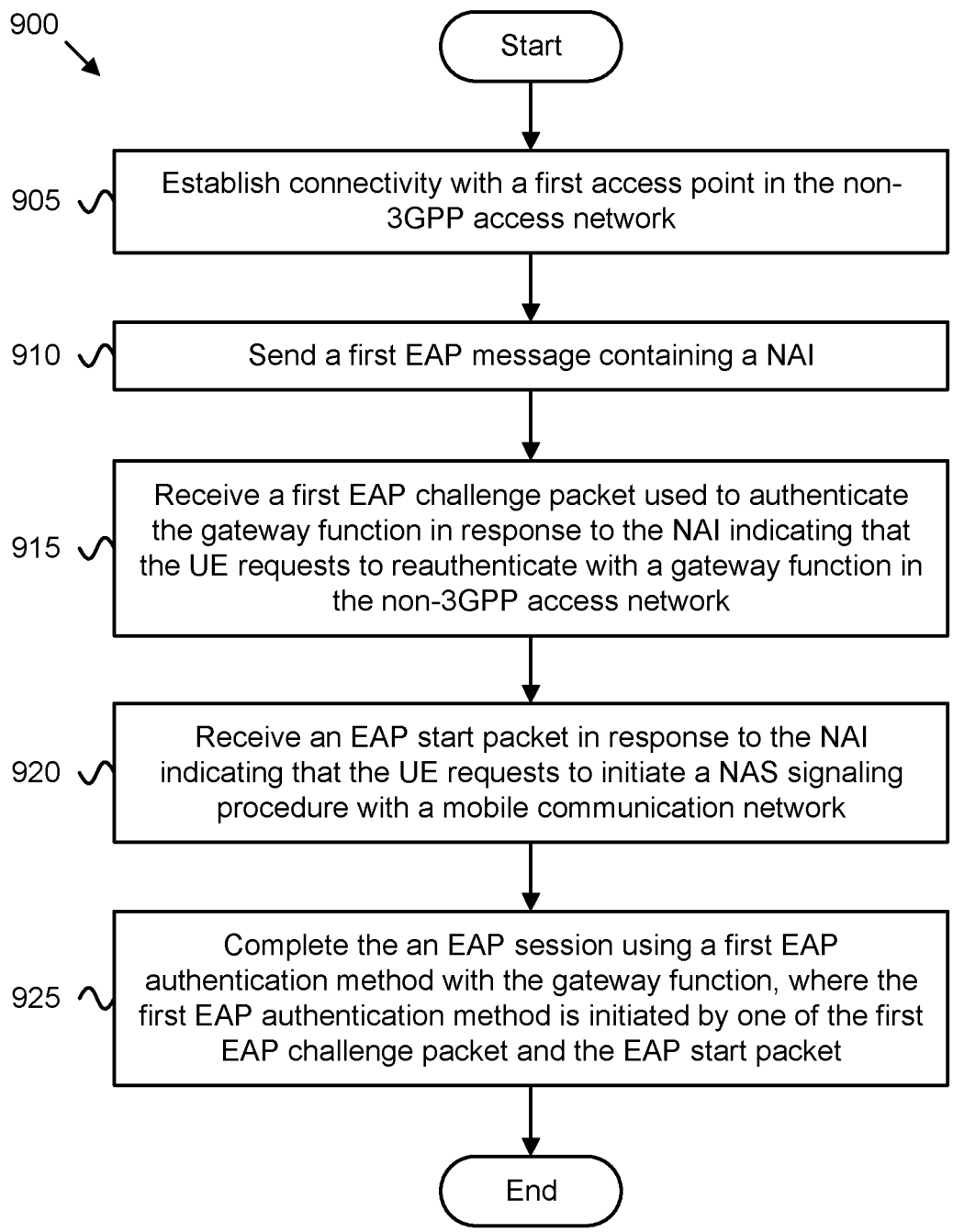
FIG. 9 is a flow chart diagram illustrating one embodiment of a first method for supporting TNGF reauthentication.

FIG. 9 depicts one embodiment of a method 900 for supporting TNGF reauthentication, according to embodiments of the disclosure. In various embodiments, the method 900 is performed by a UE, such as the remote unit 105, UE 205, and/or user equipment apparatus 700, described above. In some embodiments, the method 900 is performed by a processor, such as a microcontroller, a microprocessor, a CPU, a GPU, an auxiliary processing unit, a FPGA, or the like.

The method 900 begins and establishes 905 connectivity with a first access point in the non-3GPP access network. The method 900 includes sending 910 a first EAP message containing a NAI.

The method 900 includes receiving 915 a first EAP challenge packet used to authenticate the gateway function in response to the NAI indicating that the UE requests to reauthenticate with a gateway function in the non-3GPP access network.

The method 900 includes receiving 920 an EAP start packet in response to the NAI indicating that the UE requests to initiate a NAS signaling procedure with a mobile communication network. Here, the EAP start packet triggers the UE to send a first NAS message to the mobile communication network.

The method 900 includes completing 925 an EAP session using the first EAP authentication method with the gateway function. Here, the first EAP authentication method is initiated by one of the first EAP challenge packet and the EAP start packet. The method 900 ends.

Figure 10:
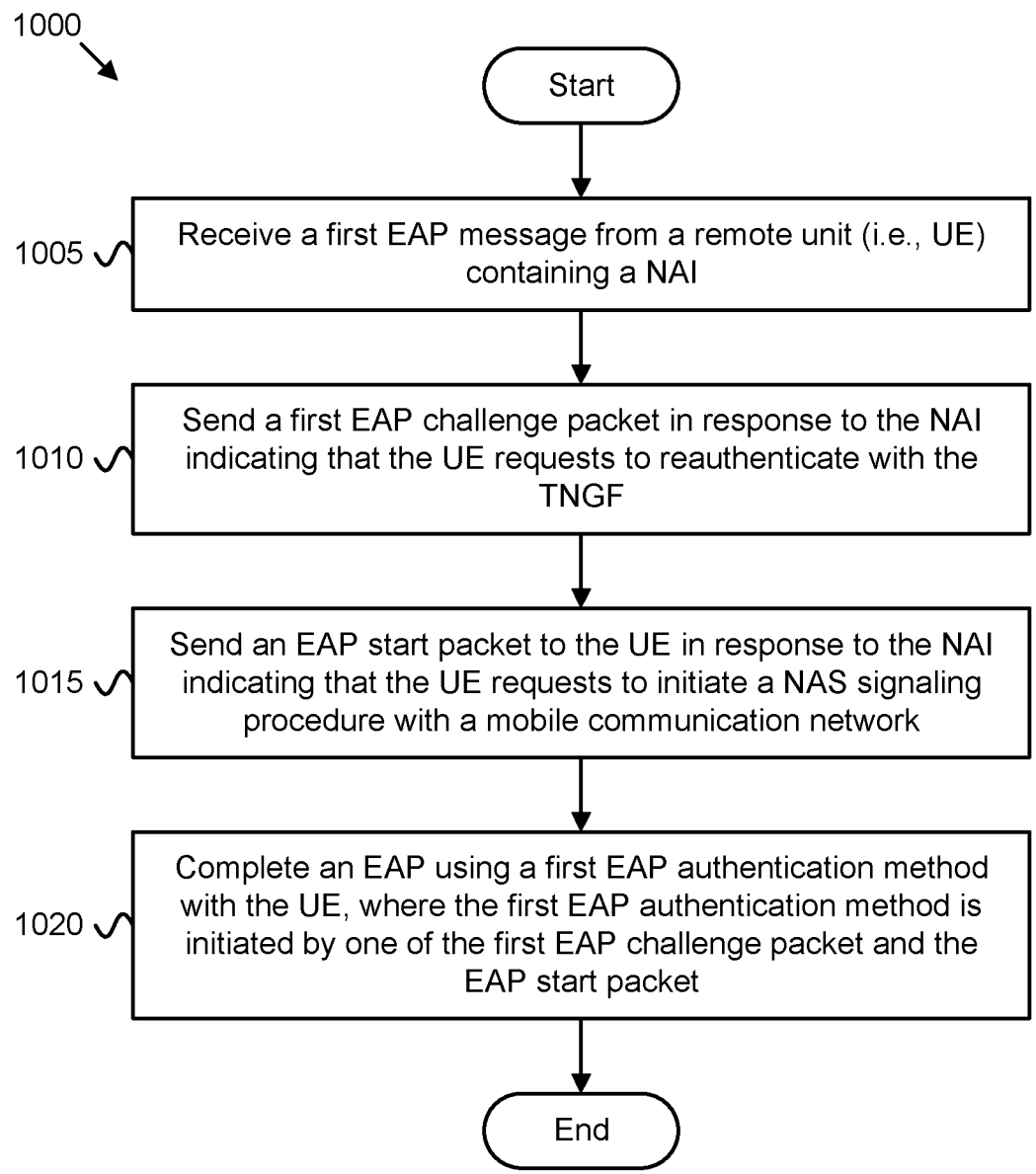
FIG. 10 is a flow chart diagram illustrating one embodiment of a second method for supporting TNGF reauthentication.

FIG. 10 depicts one embodiment of a method 1000 for supporting TNGF reauthentication, according to embodiments of the disclosure. In various embodiments, the method 1000 is performed by a TNGF, such as the TNGF-1 125, TNGF 213, TNGF1 501, and/or network equipment apparatus 800, described above. In some embodiments, the method 1000 is performed by a processor, such as a microcontroller, a microprocessor, a CPU, a GPU, an auxiliary processing unit, a FPGA, or the like.

The method 1000 begins and receives 1005 a first EAP message from a remote unit (i.e., UE) containing a NAI. The method 1000 includes sending 1010 a first EAP challenge packet in response to the NAI indicating that the UE requests to reauthenticate with the TNGF. Here, the first EAP challenge packet is used to authenticate the TNGF with the UE.

The method 1000 includes sending 1015 an EAP start packet to the UE in response to the NAI indicating that the UE requests to initiate a NAS signaling procedure with a mobile communication network. Here, the EAP start packet triggers the UE to send a first NAS message to the mobile communication network.

The method 1000 includes completing 1020 an EAP session with the UE using a first EAP authentication method. Here, the first EAP authentication method is initiated by one of the first EAP challenge packet and the EAP start packet. The method 1000 ends.

Figure 11:
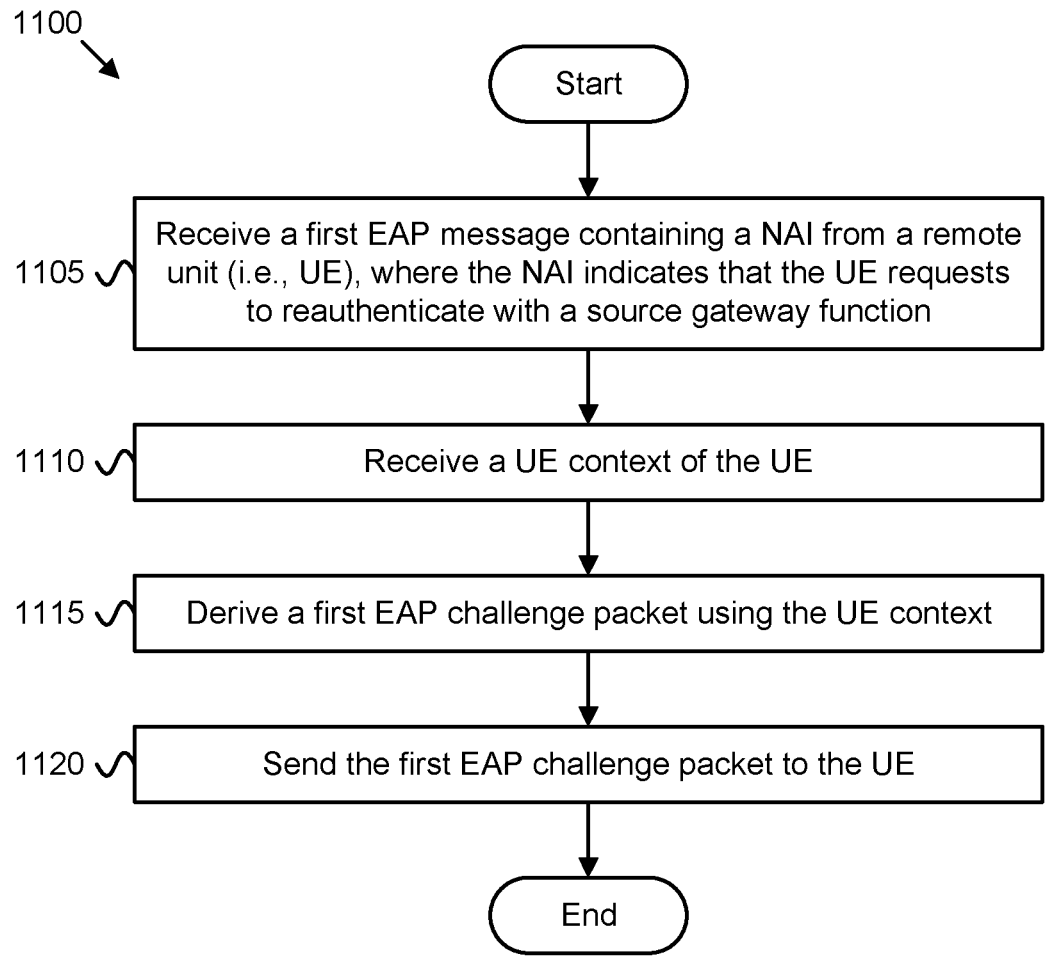
FIG. 11 is a flow chart diagram illustrating one embodiment of a third method for supporting TNGF reauthentication.

FIG. 11 depicts one embodiment of a method 1100 for supporting TNGF reauthentication, according to embodiments of the disclosure. In various embodiments, the method 1100 is performed by a target TNGF, such as the TNGF-2 127, TNGF 213, TNGF2 503, and/or network equipment apparatus 800, described above. In some embodiments, the method 1100 is performed by a processor, such as a microcontroller, a microprocessor, a CPU, a GPU, an auxiliary processing unit, a FPGA, or the like.

The method 1100 begins and receives 1105 a first EAP message containing a NAI from a remote unit (i.e., UE). Here, the NAI indicates that the UE requests to reauthenticate with a source gateway function. The method 1100 includes receiving 1110 a UE context of the UE.

The method 1100 includes deriving 1115 a first EAP challenge packet using the UE context. The method 1100 includes sending 1120 the first EAP challenge packet to the UE. Here, the first EAP challenge packet is used to authenticate the target TNGF with the UE. The method 1100 ends.

Figure 12:
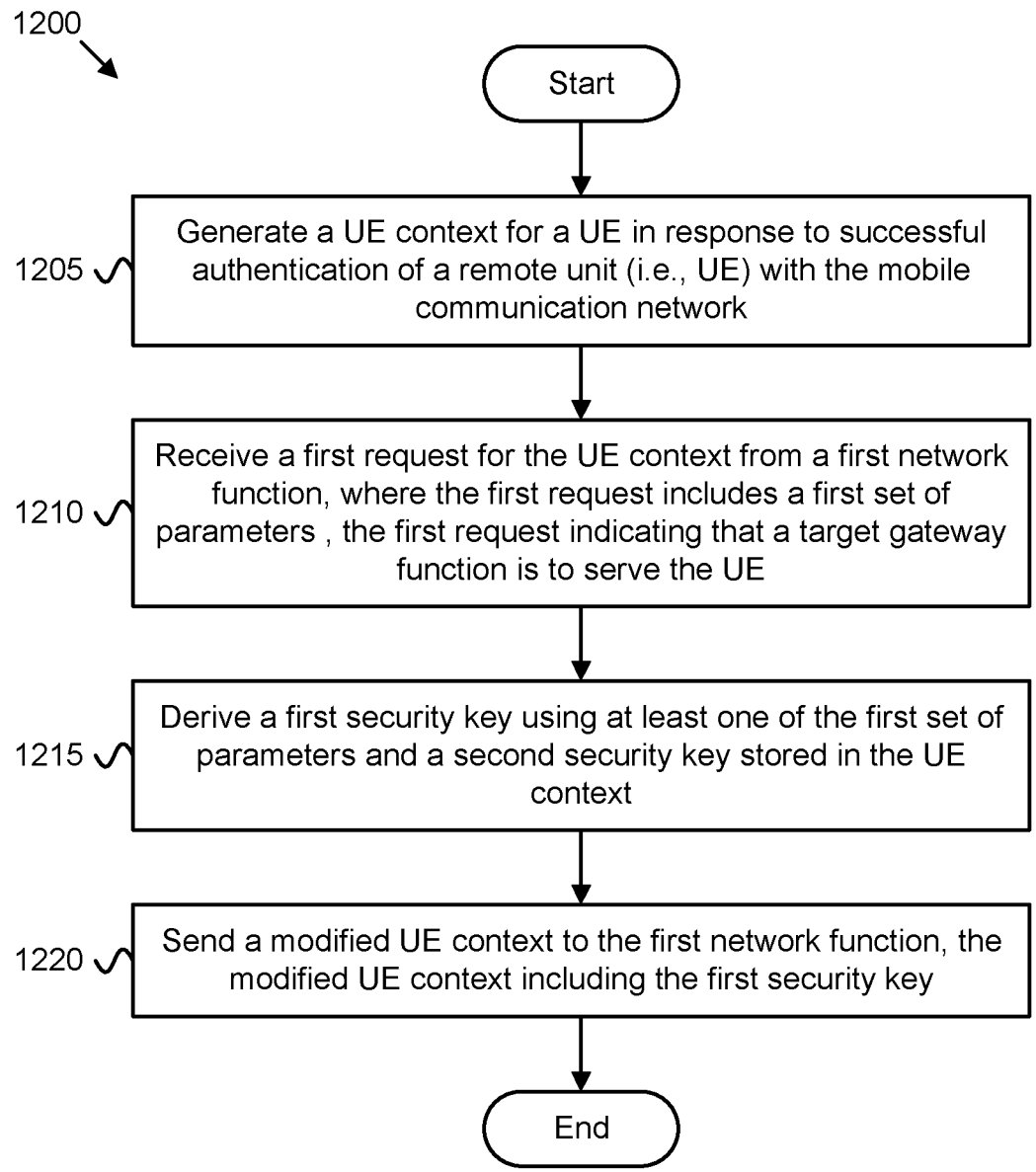
FIG. 12 is a flow chart diagram illustrating one embodiment of a fourth method for supporting TNGF reauthentication.

FIG. 12 depicts one embodiment of a method 1200 for supporting TNGF reauthentication, according to embodiments of the disclosure. In various embodiments, the method 1200 is performed by a source TNGF, such as the TNGF-1 125, TNGF 213, TNGF1 501, and/or network equipment apparatus 800, described above. In some embodiments, the method 1200 is performed by a processor, such as a microcontroller, a microprocessor, a CPU, a GPU, an auxiliary processing unit, a FPGA, or the like.

The method 1200 begins and generates 1205 a UE context for a UE in response to successful authentication of a remote unit (i.e., UE) with the mobile communication network. The method 1200 includes receiving 1210 a first request for the UE context from a first network function (e.g., TNGF2 or AMF). Here, the first request includes a first set of parameters (e.g., Reauth-ID, TNGF2-ID, TNonce), the first request indicating that a target gateway function (e.g., TNGF2) is to serve the UE.

The method 1200 includes deriving 1215 a first security key (e.g., TNGF* key) using at least one of the first set of parameters and a second security key (e.g., TNGF key) stored in the UE context. The method 1200 includes sending 1220 a modified UE context to the first network function, the modified UE context including the first security key. The method 1200 ends.

Figure 13:
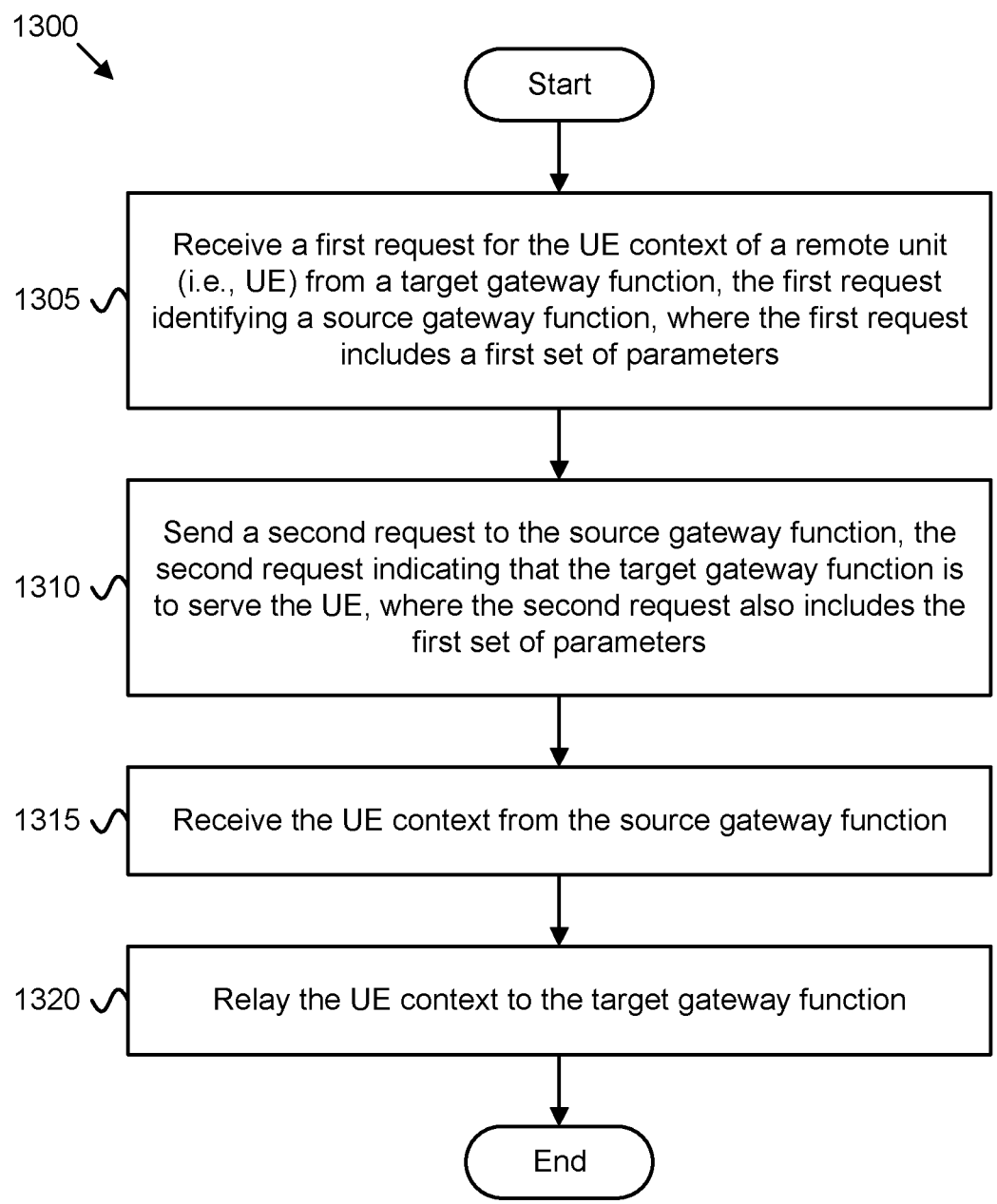
FIG. 13 is a flow chart diagram illustrating one embodiment of a fifth method for supporting TNGF reauthentication.

FIG. 13 depicts one embodiment of a method 1300 for supporting TNGF reauthentication, according to embodiments of the disclosure. In various embodiments, the method 1300 is performed by an AMF, such as the AMF 143, AMF 301, and/or network equipment apparatus 800, described above. In some embodiments, the method 1300 is performed by a processor, such as a microcontroller, a microprocessor, a CPU, a GPU, an auxiliary processing unit, a FPGA, or the like.

The method 1300 begins and receives 1305 a first request for the UE context of a remote unit (i.e., UE) from a target gateway function (e.g., TNGF2), the first request identifying a source gateway function (e.g., TNGF1). Here, the first request includes a first set of parameters.

The method 1300 includes sending 1310 a second request to the source gateway function, the second request indicating that the target gateway function is to serve the UE. Here, the second request also includes the first set of parameters.

The method 1300 includes receiving 1315 the UE context from the source gateway function. The method 1300 includes relaying 1320 the UE context to the target gateway function. The method 1300 ends.

Disclosed herein is a first apparatus for supporting TNGF reauthentication, according to embodiments of the disclosure. The first apparatus may be implemented by a UE, such as the remote unit 105, UE 205, and/or user equipment apparatus 700. The first apparatus includes a transceiver that communicates with a non-3GPP access network and a processor that establishes connectivity with a first access point in the non-3GPP access network. Here, the first access point initiates an EAP session to authenticate the UE. The processor sends a first EAP message containing a NAI (e.g., the EAP-Response/Identity packet of FIG. 2A, Step 3). If the NAI indicates that the UE requests to reauthenticate with a gateway function in the non-3GPP access network, then the processor receives a first EAP challenge packet used to authenticate the gateway function. If the NAI indicates that the UE requests to initiate a NAS signaling procedure with a mobile communication network, then the processor receives an EAP start packet. Here, the EAP start packet triggers the processor to send a first NAS message to the mobile communication network. The processor completes an EAP session using the first EAP authentication method with the gateway function. Here, the first EAP authentication method is initiated by one of the first EAP challenge packet and the EAP start packet.

In some embodiments, the first EAP message includes an identity for the mobile communication network and an identity of the gateway function. Here, the UE is connected to the gateway function and the gateway function relays NAS messages between the UE and the mobile communication network. In certain embodiments, the NAS signaling procedure including one of: a NAS Registration Request procedure and a NAS Service Request procedure.

In some embodiments, the NAI indicates that the UE requests to reauthenticate with the gateway function by including a reauthentication identifier in the NAI. In some embodiments, the NAI indicates that the UE requests to reauthenticate with the gateway function in response to determining that reconnection to the gateway function is to be established via a second access point.

In some embodiments, the first EAP challenge packet contains a first set of parameters (e.g., TNonce, MAC1), wherein the processor uses the first set of parameters and a TNGF key stored in the UE to authenticate the gateway function. In some embodiments, the first set of parameters includes a first nonce and a first message authentication code (MAC1) used to authenticate the gateway function, wherein the processor authenticates the first message authentication code using the first nonce (e.g., TNonce) and a TNGF key stored in the UE.

In various embodiments, the processor sends a second EAP challenge packet in response to successfully authenticating the gateway function, wherein the second EAP challenge packet includes a second nonce (e.g., UNonce) and a second message authentication code (MAC2) derived by using the TNGF key stored in the UE, the second nonce, and at least one of the first set of parameters (e.g., TNonce).

In certain embodiments, the processor completes the EAP session using the first EAP authentication method by sending the second EAP challenge packet and receiving an EAP success packet. Here, the gateway function sends the EAP success packet in response to successfully authenticating the UE using the second EAP challenge packet. In certain embodiments, the processor completes the EAP session using the first EAP authentication method by sending the second EAP challenge packet and receiving an EAP failure packet. Here, the gateway function sends the EAP failure packet in response to unsuccessfully authenticating the UE using the second EAP challenge packet.

In some embodiments, the processor derives a new reauthentication identifier of the UE using the second nonce and at least one of the first set parameters, wherein the processor further derives a new TNAP key using the second nonce and at least one of the first set parameters, and wherein the processor uses the new TNAP key to establish a security association with the second access point.

In some embodiments, the first set of parameters further includes a gateway function identity (e.g., TNGF2-ID) and a network address of the gateway function (e.g., TNGF2 Address), wherein at least one of the gateway function identity and the network address indicate a change in serving gateway function. In certain embodiments, the processor derives a second TNGF key (e.g., TNGF* key) using the TNGF key stored in the UE, the first nonce, and the network address of the UE. In such embodiments, the processor authenticates the first message authentication code (MAC1) using the first nonce (e.g., TNonce) and the second TNGF key.

Disclosed herein is a first method for supporting TNGF reauthentication, according to embodiments of the disclosure. The first method may be performed by a UE, such as the remote unit 105, UE 205, and/or user equipment apparatus 700. The first method includes establishing connectivity with a first access point in the non-3GPP access network. Here, the first access point initiates an EAP session to authenticate the UE. The first method includes sending a first EAP message containing a NAI (e.g., the EAP-Response/Identity packet of FIG. 2A, Step 3). If the NAI indicates that the UE requests to reauthenticate with a gateway function in the non-3GPP access network, then the first method includes receiving a first EAP challenge packet used to authenticate the gateway function. If the NAI indicates that the UE requests to initiate a NAS signaling procedure with a mobile communication network, then the first method includes receiving an EAP start packet. Here, the EAP start packet triggers the UE to send a first NAS message to the mobile communication network. The first method includes completing an EAP session using a first EAP authentication method with the gateway function. Here, the first EAP authentication method is initiated by one of the first EAP challenge packet and the EAP start packet.

In some embodiments, the first EAP message includes an identity for the mobile communication network and an identity of the gateway function. Here, the UE is connected to the gateway function and wherein the gateway function relays NAS messages between the UE and the mobile communication network. In certain embodiments, the NAS signaling procedure including one of: a NAS Registration Request procedure and a NAS Service Request procedure.

In some embodiments, the NAI indicates that the UE requests to reauthenticate with the gateway function by including a reauthentication identifier in the NAI. In some embodiments, the NAI indicates that the UE requests to reauthenticate with the gateway function in response to determining that reconnection to the gateway function is to be established via a second access point.

In some embodiments, the first EAP challenge packet contains a first set of parameters (e.g., TNonce, MAC1), wherein the first method includes using the first set of parameters and a TNGF key stored in the UE to authenticate the gateway function. In some embodiments, the first set of parameters includes a first nonce and a first message authentication code (MAC1) used to authenticate the gateway function, wherein the first method includes authenticating the first message authentication code using the first nonce (e.g., TNonce) and a TNGF key stored in the UE.

In various embodiments, the first method includes sending a second EAP challenge packet in response to successfully authenticating the gateway function, wherein the second EAP challenge packet includes a second nonce (e.g., UNonce) and a second message authentication code (MAC2) derived by using the TNGF key stored in the UE, the second nonce, and at least one of the first set of parameters (e.g., TNonce).

In certain embodiments, the first method includes completing the EAP session using the first EAP authentication method by sending the second EAP challenge packet and receiving an EAP success packet. Here, the gateway function sends the EAP success packet in response to successfully authenticating the UE using the second EAP challenge packet. In certain embodiments, the first method includes completing the EAP session using the first EAP authentication method by sending the second EAP challenge packet and receiving an EAP failure packet. Here, the gateway function sends the EAP failure packet in response to unsuccessfully authenticating the UE using the second EAP challenge packet.

In some embodiments, the first method includes deriving a new reauthentication identifier of the UE using the second nonce and at least one of the first set parameters, wherein the first method includes further deriving a new TNAP key using the second nonce and at least one of the first set parameters, and wherein the first method includes using the new TNAP key to establish a security association with the second access point.

In some embodiments, the first set of parameters further includes a gateway function identity (e.g., TNGF2-ID) and a network address of the gateway function (e.g., TNGF2 Address), wherein at least one of the gateway function identity and the network address indicate a change in serving gateway function. In certain embodiments, the first method includes deriving a second TNGF key (e.g., TNGF* key) using the TNGF key stored in the UE, the first nonce, and the network address of the UE. In such embodiments, the first method includes authenticating the first message authentication code (MAC1) using the first nonce (e.g., TNonce) and the second TNGF key.

Disclosed herein is a second apparatus for supporting TNGF reauthentication, according to embodiments of the disclosure. The second apparatus may be implemented by a TNGF, such as the TNGF-1 125, TNGF 213, TNGF1 501, and/or network equipment apparatus 800. The second apparatus includes a network interface that communicates with a remote unit (i.e., UE) and with a mobile communication network. The second apparatus includes a processor that receives a first EAP message from the UE containing a NAI and sends a first EAP challenge packet in response to the NAI indicating that the UE requests to reauthenticate with the TNGF. Here, the first EAP challenge packet is used to authenticate the TNGF with the UE. The processor sends an EAP start packet to the UE in response to the NAI indicating that the UE requests to initiate a NAS signaling procedure with the mobile communication network. Here, the EAP start packet triggers the UE to send a first NAS message to the mobile communication network. The processor completes an EAP session with the UE using the first EAP authentication method. Here, the first EAP authentication method is initiated by one of the first EAP challenge packet and the EAP start packet.

In some embodiments, the first EAP challenge packet contains a first set of parameters. Here, the first set of parameters including a first nonce and a first message authentication code (MAC1) derived by using the first nonce (e.g., TNonce) and a TNGF key stored in the TNGF. In such embodiments, the UE uses the first message authentication code to authenticate the TNGF.

In some embodiments, the processor receives a second EAP challenge packet from the UE. Here, the UE sends the second EAP challenge packet in response to successfully authenticating the first EAP challenge packet. In such embodiments, the second EAP challenge packet includes a second nonce (e.g., UNonce) and a second message authentication code (MAC2) derived by using the TNGF key stored in the UE, the second nonce, and at least one of the first set of parameters (e.g., TNonce).

In various embodiments, the processor further authenticates the UE using the second EAP challenge packet. In certain embodiments, the processor further authenticates the UE using the second EAP challenge packet, wherein the processor completes the EAP session using the first EAP authentication method by sending an EAP failure packet in response to unsuccessfully authenticating the UE.

In some embodiments, the processor completes the EAP session using the first EAP authentication method by sending an EAP success packet in response to successfully authenticating the UE. In some embodiments, the processor derives a new reauthentication identifier of the UE in response to successfully authenticating the UE using the second nonce and at least one of the first set parameters. Additionally, the processor derives a new TNAP key using the second nonce and at least one of the first set parameters. In such embodiments, the UE uses the new TNAP key to protect communication on an air interface.

In various embodiments, the NAI indicates that the UE requests to reauthenticate with the TNGF by including a reauthentication identifier in the NAI.

Disclosed herein is a second method for supporting TNGF reauthentication, according to embodiments of the disclosure. The second method may be implemented by a TNGF, such as the TNGF-1 125, TNGF 213, TNGF1 501, and/or network equipment apparatus 800. The second method includes receiving a first EAP message from a remote unit (i.e., UE) containing a NAI and sending a first EAP challenge packet in response to the NAI indicating that the UE requests to reauthenticate with the TNGF. Here, the first EAP challenge packet is used to authenticate the TNGF with the UE. The second method includes sending an EAP start packet to the UE in response to the NAI indicating that the UE requests to initiate a NAS signaling procedure with a mobile communication network. Here, the EAP start packet triggers the UE to send a first NAS message to the mobile communication network. The second method includes completing an EAP session with the UE using the first EAP authentication method. Here, the first EAP authentication method is initiated by one of the first EAP challenge packet and the EAP start packet.

In some embodiments, the first EAP challenge packet contains a first set of parameters. Here, the first set of parameters including a first nonce and a first message authentication code (MAC1) derived by using the first nonce (e.g., TNonce) and a TNGF key stored in the TNGF. In such embodiments, the UE uses the first message authentication code to authenticate the TNGF.

In some embodiments, the second method includes receiving a second EAP challenge packet from the UE. Here, the UE sends the second EAP challenge packet in response to successfully authenticating the first EAP challenge packet. In such embodiments, the second EAP challenge packet includes a second nonce (e.g., UNonce) and a second message authentication code (MAC2) derived by using the TNGF key stored in the UE, the second nonce, and at least one of the first set of parameters (e.g., TNonce).

In various embodiments, the second method includes authenticating the UE using the second EAP challenge packet. In certain embodiments, the TNGF completes the EAP session using the first EAP authentication method by sending an EAP failure packet in response to unsuccessfully authenticating the UE.

In some embodiments, the TNGF completes the EAP session using the first EAP authentication method by sending an EAP success packet in response to successfully authenticating the UE. In some embodiments, the second method includes deriving a new reauthentication identifier of the UE in response to successfully authenticating the UE using the second nonce and at least one of the first set parameters. Additionally, the second method includes deriving a new TNAP key using the second nonce and at least one of the first set parameters. In such embodiments, the UE uses the new TNAP key to protect communication on an air interface.

In various embodiments, the NAI indicates that the UE requests to reauthenticate with the TNGF by including a reauthentication identifier in the NAI.

Disclosed herein is a third apparatus for supporting TNGF reauthentication, according to embodiments of the disclosure. The third apparatus may be implemented by a target TNGF, such as the TNGF-2 127, TNGF 213, TNGF2 503, and/or network equipment apparatus 800. The third apparatus includes a network interface that communicates with a remote unit (i.e., UE) and with a mobile communication network. The third apparatus includes a processor that receives a first EAP message containing a NAI (e.g., the EAP-Response/Identity packet of FIG. 2A, Step 3) from the UE. Here, the NAI indicates that the UE requests to reauthenticate with a source gateway function. The processor receives a UE context of the UE and derives a first EAP challenge packet using the UE context. Via the network interface, the processor sends the first EAP challenge packet to the UE. Here, the first EAP challenge packet is used to authenticate the target TNGF with the UE.

In some embodiments, the processor determines whether the target TNGF supports signaling exchange (e.g., a Tn interface) with the source gateway function. In some embodiments, receiving the UE context includes requesting the UE context of the UE from the source gateway function in response to the target TNGF supporting signaling exchange with the source gateway function. In certain embodiments, the processor requests the UE context of the UE by sending a first request to the source gateway function. Here, the first request contains a first set of parameters (e.g., Reauth-ID, TNGF2-ID, TNonce) including a gateway function identity of the target TNGF and a reauthentication identity. In such embodiments, the reauthentication identity is used to identify the UE context stored in the source gateway function.

In some embodiments, receiving the UE context includes requesting the UE context from an AMF in the mobile communication network in response to the target TNGF not supporting connectivity with the source gateway function. In certain embodiments, the processor requests the UE context of the UE by sending a second request to the AMF. Here, the second request contains a first set of parameters (e.g., Reauth-ID, TNGF2-ID, TNonce) including a gateway function identity of the target TNGF, a gateway identity of the source gateway function and a reauthentication identity. In such embodiments, the reauthentication identity is used to identify the UE context stored in the source gateway function.

In some embodiments, the NAI indicates that the UE requests to reauthenticate with a gateway function by including a reauthentication identifier in the NAI. In some embodiments, the EAP challenge packet includes a first set of parameters and the UE context includes a source TNGF key (e.g., the TNGF* key) derived from a second TNGF key (e.g., the TNGF key) stored in the source gateway function and at least one of the first set of parameters.

In some embodiments, the first set of parameters includes a gateway function identity, a first nonce, and a first message authentication code (e.g., MAC1) derived by using the first nonce (e.g., a TNonce) and the source TNGF key. Here, the UE uses the first message authentication code to authenticate the target TNGF. In certain embodiments, the first set of parameters further contains a network address of the target TNGF. Here, at least one of the gateway function identity and the network address indicate a change in serving gateway function to the UE.

In certain embodiments, the processor receives a second EAP challenge packet from the UE, the UE sending the second EAP challenge packet in response to successfully authenticating the target TNGF. In such embodiments, the second EAP challenge packet includes a second nonce (e.g., a UNonce) and a second message authentication code (e.g., MAC2) derived by using the source TNGF key in the UE, the second nonce and at least one of the first set of parameters (e.g., a TNonce). In various embodiments, the processor further authenticates the UE using the second EAP challenge packet.

In some embodiments, the processor sends an EAP success packet in response to successfully authenticating the UE. In such embodiments, the processor further derives a new TNAP key, a new IPsec key and a new reauthentication identifier of the UE using the second nonce (e.g., UNonce) and at least one of the first set of parameters. In certain embodiments, the UE context includes a PDU session resource list. In such embodiments, the processor establishes an IPsec connection (e.g., NWt connection) with the UE using the IPsec key, and establishes at least one child security association with the UE using the PDU session resource list in response to establishing the IPsec connection.

In some embodiments, the processor further authenticates the UE using the second EAP challenge packet. In such embodiments, the processor sends an EAP failure packet in response to unsuccessfully authenticating the UE.

Disclosed herein is a third method for supporting TNGF reauthentication, according to embodiments of the disclosure. The third method may be implemented by a target TNGF, such as the TNGF-2 127, TNGF 213, TNGF2 503, and/or network equipment apparatus 800. The third method includes receiving a first EAP message containing a NAI (e.g., the EAP-Response/Identity packet of FIG. 2A, Step 3) from a remote unit (i.e., UE). Here, the NAI indicates that the UE requests to reauthenticate with a source gateway function. The third method includes receiving a UE context of the UE and deriving a first EAP challenge packet using the UE context. The third method includes sending the first EAP challenge packet to the UE. Here, the first EAP challenge packet is used to authenticate the target TNGF with the UE.

In some embodiments, the third method includes determining whether the target TNGF supports signaling exchange (e.g., a Tn interface) with the source gateway function. In some embodiments, receiving the UE context includes requesting the UE context of the UE from the source gateway function in response to the target TNGF supporting signaling exchange with the source gateway function. In certain embodiments, the third method includes requesting the UE context of the UE by sending a first request to the source gateway function. Here, the first request contains a first set of parameters (e.g., Reauth-ID, TNGF2-ID, TNonce) including a gateway function identity of the target TNGF and a reauthentication identity. In such embodiments, the reauthentication identity is used to identify the UE context stored in the source gateway function.

In some embodiments, receiving the UE context includes requesting the UE context from an AMF in the mobile communication network in response to the target TNGF not supporting connectivity with the source gateway function. In certain embodiments, the third method includes requesting the UE context of the UE by sending a second request to the AMF. Here, the second request contains a first set of parameters (e.g., Reauth-ID, TNGF2-ID, TNonce) including a gateway function identity of the target TNGF, a gateway identity of the source gateway function and a reauthentication identity. In such embodiments, the reauthentication identity is used to identify the UE context stored in the source gateway function.

In some embodiments, the NAI indicates that the UE requests to reauthenticate with a gateway function by including a reauthentication identifier in the NAI. In some embodiments, the EAP challenge packet includes a first set of parameters and the UE context includes a source TNGF key (e.g., the TNGF* key) derived from a second TNGF key (e.g., the TNGF key) stored in the source gateway function and at least one of the first set of parameters.

In some embodiments, the first set of parameters includes a gateway function identity, a first nonce, and a first message authentication code (e.g., MAC1) derived by using the first nonce (e.g., a TNonce) and the source TNGF key. Here, the UE uses the first message authentication code to authenticate the target TNGF. In certain embodiments, the first set of parameters further contains a network address of the target TNGF (e.g., TNGF2 address). Here, at least one of the gateway function identity and the network address indicate a change in serving gateway function to the UE.

In certain embodiments, the third method includes receiving a second EAP challenge packet from the UE, the UE sending the second EAP challenge packet in response to successfully authenticating the target TNGF. In such embodiments, the second EAP challenge packet includes a second nonce (e.g., a UNonce) and a second message authentication code (e.g., MAC2) derived by using the source TNGF key in the UE, the second nonce and at least one of the first set of parameters (e.g., a TNonce). In various embodiments, the third method includes further authenticates the UE using the second EAP challenge packet.

In some embodiments, the third method includes sending an EAP success packet in response to successfully authenticating the UE. In such embodiments, the third method includes deriving a new TNAP key, a new IPsec key and a new reauthentication identifier using the second nonce (e.g., UNonce) and at least one parameter from the first set of parameters. In certain embodiments, the UE context includes a PDU session resource list. In such embodiments, the third method includes establishing an IPsec connection (e.g., NWt connection) with the UE using the IPsec key, and establishing at least one child security association with the UE and the PDU session resource list in response to establishing the IPsec connection.

In some embodiments, the third method includes authenticating the UE using the second EAP challenge packet. In such embodiments, the third method includes sending an EAP failure packet in response to unsuccessfully authenticating the UE.

Disclosed herein is a fourth apparatus for supporting TNGF reauthentication, according to embodiments of the disclosure. The fourth apparatus may be implemented by a source TNGF, such as the TNGF-1 125, TNGF 213, TNGF1 501, and/or network equipment apparatus 800. The fourth apparatus includes a network interface that communicates with a remote unit (i.e., UE) and a mobile communication network. The fourth apparatus includes a processor that generates a UE context for a UE in response to successful authentication of the UE with the mobile communication network and receives a first request for the UE context from a first network function (e.g., TNGF2 or AMF). Here, the first request includes a first set of parameters (e.g., Reauth- ID, TNGF2-ID, TNonce), the first request indicating that a target gateway function (e.g., TNGF2) is to serve the UE. The processor derives a first security key (e.g., TNGF* key) using at least one of the first set of parameters and a second security key (e.g., TNGF key) stored in the UE context. Via the network interface, the processor sends a modified UE context to the first network function, the modified UE context including the first security key.

In some embodiments, the processor generates a reauthentication identity of the UE in response to successful authentication of the UE with the mobile communication network, wherein the first set of parameters includes the reauthentication identity of the UE, a first nonce (e.g., TNonce) and the gateway function identity of the target gateway function.

In some embodiments, the modified UE context further includes a UE identity of the UE, an identity of an AMF serving the UE, and a PDU session resource list. In certain embodiments, the first network function is the target gateway function. In other embodiments, the first network function is an AMF serving the UE.

Disclosed herein is a fourth method for supporting TNGF reauthentication, according to embodiments of the disclosure. The fourth method may be implemented by a source TNGF, such as the TNGF-1 125, TNGF 213, TNGF1 501, and/or network equipment apparatus 800. The fourth method includes generating a UE context for a UE in response to successful authentication of a remote unit (i.e., UE) with the mobile communication network and receiving a first request for the UE context from a first network function (e.g., TNGF2 or AMF). Here, the first request includes a first set of parameters (e.g., Reauth-ID, TNGF2-ID, TNonce), the first request indicating that a target gateway function (e.g., TNGF2) is to serve the UE. The fourth method includes deriving a first security key (e.g., TNGF* key) using at least one of the first set of parameters and a second security key (e.g., TNGF key) stored in the UE context. The fourth method includes sending a modified UE context to the first network function, the modified UE context including the first security key.

In some embodiments, the fourth method includes generating a reauthentication identity of the UE in response to successful authentication of the UE with the mobile communication network, wherein the first set of parameters includes the reauthentication identity of the UE, a first nonce (e.g., TNonce) and the gateway function identity of the target gateway function.

In some embodiments, the modified UE context further includes a UE identity of the UE, an identity of an AMF serving the UE, and a PDU session resource list. In certain embodiments, the first network function is the target gateway function. In other embodiments, the first network function is an AMF serving the UE.

Disclosed herein is a fifth apparatus for supporting TNGF reauthentication, according to embodiments of the disclosure. The fifth apparatus may be implemented by an AMF, such as the AMF 143, AMF 301, and/or network equipment apparatus 800. The fifth apparatus includes a network interface that communicates with at least one gateway function. The fifth apparatus includes a processor that receives a first request for a UE context of a remote unit (i.e., UE) from a target gateway function (e.g., TNGF2), the first request identifying a source gateway function (e.g., TNGF1). Here, the first request includes a first set of parameters (e.g., Reauth-ID, TNGF2-ID, TNonce). The processor sends a second request to the source gateway function, the second request indicating that the target gateway function is to serve the UE. Here, the second request also includes the first set of parameters. Via the network interface, the processor receives the UE context from the source gateway function and relays the UE context to the target gateway function.

In some embodiments, the first set of parameters includes a reauthentication identity of the UE and a gateway function identity of the target gateway function. In some embodiments, the UE context includes a UE identity of the UE, an AMF identity of the AMF serving the UE, a first TNGF key, and a PDU session resource list.

Disclosed herein is a fifth method for supporting TNGF reauthentication, according to embodiments of the disclosure. The fifth method may be implemented by an AMF, such as the AMF 143, AMF 301, and/or network equipment apparatus 800. The fifth method includes receiving a first request for a UE context of a remote unit (i.e., UE) from a target gateway function (e.g., TNGF2), the first request identifying a source gateway function (e.g., TNGF1). Here, the first request includes a first set of parameters (e.g., Reauth-ID, TNGF2-ID, TNonce). The fifth method includes sending a second request to the source gateway function, the second request indicating that the target gateway function is to serve the UE. Here, the second request also includes the first set of parameters. The fifth method includes receiving the UE context from the source gateway function and relaying the UE context to the target gateway function.

In some embodiments, the first set of parameters includes a reauthentication identity of the UE and a gateway function identity of the target gateway function. In some embodiments, the UE context includes a UE identity of the UE, an AMF identity of the AMF serving the UE, a first TNGF key, and a PDU session resource list.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A target gateway apparatus comprising:
at least one memory; and
at least one processor coupled with the at least one memory and configured to cause the target gateway apparatus to:
receive, from a user equipment ("UE"), a first extensible authentication protocol ("EAP") message containing a network access identifier ("NAI") of the UE, wherein the NAI comprises a gateway function identity of a source gateway function and a reauthentication identity that indicates the UE is authenticated with the source gateway function;
transmit, to the source gateway function, a context request message comprising the reauthentication identity;
receive a UE context of the UE from the source gateway function, the UE context comprising a first security key shared between the UE and the source gateway function;
derive, based at least in part on the UE context, a first EAP challenge packet for authenticating the target gateway apparatus, wherein the first EAP challenge packet comprises an indication of a change in a serving gateway and a message authentication code based on the first security key; and
transmit the first EAP challenge packet to the UE.

2. The target gateway apparatus of claim 1, wherein the at least one processor is configured to cause the target gateway apparatus to determine whether signaling exchange with the source gateway function is supported by the target gateway apparatus.

3. The target gateway apparatus of claim 2, wherein to receive the UE context, the at least one processor is configured to cause the target gateway apparatus to request the UE context from the source gateway function in response to the signaling exchange with the source gateway function being supported by the target gateway apparatus.

4. The target gateway apparatus of claim 3, wherein to request the UE context, the at least one processor is configured to cause the target gateway apparatus to transmit, to the source gateway function, a first request comprising a first set of parameters, wherein the first set of parameters comprises a second gateway function identity of the target gateway apparatus, and the reauthentication identity for identifying the UE context.

5. The target gateway apparatus of claim 2, wherein to receive the UE context, the at least one processor is configured to cause the target gateway apparatus to request the UE context from an access and mobility management function ("AMF") in response to a connectivity with the source gateway function being unsupported by the target gateway apparatus.

6. The target gateway apparatus of claim 5, wherein the at least one processor is configured to cause the target gateway apparatus to transmit, to the AMF, a second request comprising a first set of parameters, wherein the first set of parameters comprises a second gateway function identity of the target gateway apparatus, a gateway identity of the source gateway function, and the reauthentication identity for identifying the UE context.

7. The target gateway apparatus of claim 1, wherein the first EAP challenge packet comprises a first set of parameters, and wherein the first security key comprises a first Trusted Non-3GPP Gateway Function ("TNGF") key based at least in part on a second TNGF key and at least one parameter of the first set of parameters.

8. The target gateway apparatus of claim 7, wherein the first set of parameters includes a second gateway function identity of the target gateway apparatus, a first nonce, and wherein the first message authentication code is based at least in part on the first nonce and the first TNGF key.

9. The target gateway apparatus of claim 8, wherein the at least one processor is configured to cause the target gateway apparatus to receive a second EAP challenge packet from the UE in response to a successful authentication of the target gateway apparatus, and wherein the second EAP challenge packet includes a second nonce and a second message authentication code derived based at least in part on the first TNGF key, the second nonce, and at least one parameter of the first set of parameters.

10. The target gateway apparatus of claim 9, wherein the at least one processor is configured to cause the target gateway apparatus to authenticate the UE based at least in part on the second EAP challenge packet, wherein the at least one processor is configured to cause the target gateway apparatus to transmit an EAP success packet in response to a successful authentication of the UE.

11. The target gateway apparatus of claim 10, wherein the at least one processor is configured to cause the target gateway apparatus to:
derive a new reauthentication identity for the UE based at least in part on the second nonce and at least one parameter of the first set of parameters;
derive a Trusted Non-3GPP Access Point ("TNAP") key based at least in part on the second nonce and at least one parameter of the first set of parameters; and
derive an internet protocol security ("IPsec") key based at least in part on the second nonce and at least one parameter of the first set of parameters.

12. The target gateway apparatus of claim 11, wherein the UE context comprises a Packet Data Unit ("PDU") session resource list, wherein the at least one processor is configured to cause the target gateway apparatus to:
establish an IPsec connection with the UE based at least in part on the IPsec key; and
establish at least one child security association with the UE based at least in part on the PDU session resource list in response to establishing the IPsec connection.

13. The target gateway apparatus of claim 9, wherein the at least one processor is configured to cause the target gateway apparatus to:
authenticate the UE based at least in part on the second EAP challenge packet; and
transmit an EAP failure packet in response to an unsuccessful authentication of the UE.

14. The target gateway apparatus of claim 8, wherein the first set of parameters further comprises a network address of the target gateway apparatus, and wherein at least one of the second gateway function identity and the network address indicate the change in the serving gateway.

15. The target gateway apparatus of claim 1, wherein the reauthentication identity indicates that the UE requests to reauthenticate with the source gateway function, and wherein the reauthentication identity is based on a second security key shared between the UE and the source gateway function.

16. A method performed by a target gateway, the method comprising:
receiving, from a user equipment ("UE"), a first extensible authentication protocol ("EAP") message containing a network access identifier ("NAI") of the UE, wherein the NAI comprises a gateway function identity of a source gateway function and a reauthentication identity that indicates the UE is authenticated with the source gateway function;
transmit, to the source gateway function, a context request message comprising the reauthentication identity;
receiving a UE context of the UE from the source gateway function, the UE context comprising a first security key shared between the UE and the source gateway function;
deriving, based at least in part on the UE context, a first EAP challenge packet for authenticating the target gateway, wherein the first EAP challenge packet comprises an indication of a change in a serving gateway and a message authentication code based on the first security key; and
transmitting the first EAP challenge packet to the UE.

17. The method of claim 16, further comprising determining whether signaling exchange with the source gateway function is supported by the target gateway.

18. The method of claim 17, wherein receiving the UE context comprises requesting the UE context from the source gateway function in response to the signaling exchange with the source gateway function being supported by the target gateway.

19. The method of claim 17, wherein receiving the UE context comprises requesting the UE context from an access and mobility management function ("AMF") in response to a connectivity with the source gateway function being unsupported by the target gateway.

20. The method of claim 16, wherein the first EAP challenge packet comprises a first set of parameters, and wherein the first security key comprises a first Trusted Non-3GPP Gateway Function ("TNGF") key based at least in part on a second TNGF key and at least one parameter of the first set of parameters.

* * * * *